(12) United States Patent
Kerofsky et al.

(10) Patent No.: US 12,375,701 B2
(45) Date of Patent: Jul. 29, 2025

(54) REDUCED COMPLEXITY TRANSFORMS FOR HIGH BITDEPTH VIDEO CODING

(71) Applicant: QUALCOMM Incorporated, San Diego, CA (US)

(72) Inventors: Louis Joseph Kerofsky, San Diego, CA (US); Dmytro Rusanovskyy, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 17/857,558

(22) Filed: Jul. 5, 2022

(65) Prior Publication Data

US 2023/0010528 A1 Jan. 12, 2023

Related U.S. Application Data

(60) Provisional application No. 63/218,820, filed on Jul. 6, 2021.

(51) Int. Cl.
*H04N 19/44* (2014.01)
*H04N 19/176* (2014.01)
*H04N 19/18* (2014.01)
*H04N 19/70* (2014.01)

(52) U.S. Cl.
CPC .......... *H04N 19/44* (2014.11); *H04N 19/176* (2014.11); *H04N 19/18* (2014.11); *H04N 19/70* (2014.11)

(58) Field of Classification Search
CPC ...... H04N 19/44; H04N 19/176; H04N 19/18; H04N 19/70; H04N 19/124; H04N 19/157
See application file for complete search history.

(56) References Cited

U.S. PATENT DOCUMENTS

2015/0016542 A1* 1/2015 Rosewarne .......... H04N 19/126
375/240.25
2024/0187652 A1* 6/2024 Naser .................... H04N 19/91

OTHER PUBLICATIONS

Bossen F., et al., "VVC Operation Range Extensions (Draft 3)," JVET-V2005-v1, Joint Video Experts Team (JVET) of ITU-T SG 16 WP 3 and ISO/IEC JTC 1/SC 29, 22nd Meeting, by Teleconference, Apr. 20-28, 2021, pp. 1-19.
Browne A., et al., "Common Test Conditions for High Bit Depth and High Bit Rate Video Coding," JVET-T2018, Joint Video Experts Team (JVET) of ITU-T SG 16 WP 3 and ISO/IEC JTC 1/SC 29, 20th Meeting: by teleconference, Oct. 7-Oct. 16, 2020, pp. 1-6.
Browne A., et al., "Common Test Conditions for High Bit Depth and High Bit Rate Video Coding," JVET-U2018-v2, Joint Video Experts Team (JVET) of ITU-T SG 16 WP 3 and ISO/IEC JTC 1/SC 29, 21st Meeting, by Teleconference, Jan. 6-15, 2021, pp. 1-8.

(Continued)

*Primary Examiner* — James M Pontius
(74) *Attorney, Agent, or Firm* — Shumaker & Sieffert, P. A.

(57) ABSTRACT

A device for decoding video data receives encoded video data encoded at a first bit-depth; receives in an encoded video bitstream for the video data one or more syntax elements; determines a dequantization shift and a mid-transform shift based on the one or more syntax elements; and performs an inverse transform of the encoded video data at a second bit-depth using the dequantization shift and the mid-transform shift to determine residual values for a block of video data, wherein the second bit-depth is different than the first bit-depth.

28 Claims, 10 Drawing Sheets

(56) References Cited

OTHER PUBLICATIONS

Chen J., et al., "Algorithm Description for Versatile Video Coding and Test Model 13 (VTM 13)," JVET-V2002-v1, Joint Video Experts Team (JVET) of ITU-T SG 16 WP 3 and ISO/IEC JTC 1/SC 29, 22nd Meeting, by teleconference, Apr. 20-28, 2021, pp. 1-103.

ITU-T H.265: "Series H: Audiovisual and Multimedia Systems Infrastructure of Audiovisual Services—Coding of Moving Video," High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video," Versatile Video Coding, The International Telecommunication Union, Aug. 2020, 516 pages.

Kerofsky L., et al., "On Constraining Inverse Transform Precision for High Bit Depth and High Bitrate Video Coding," JVET-W0092, Joint Video Experts Team (JVET) of ITU-T SG 16 WP 3 and ISO/IEC JTC 1/SC 29, 23rd Meeting, by teleconference, Jul. 7-16, 2021, pp. 1-9.

"Thoughts on SEI Messages," Apr. 2021, 10 Pages.

Naser K., et al., "AHG8: Content Adaptive Transform Precision for High Bit Depth Coding," JVET-V0133, Joint Video Experts Team (JVET) of ITU-T SG 16 WP 3 and ISO/IEC JTC 1/SC 29, 22nd Meeting, by teleconference, Apr. 20-28, 2021, pp. 1-10.

\* cited by examiner

REDUCED COMPLEXITY TRANSFORMS FOR HIGH BITDEPTH VIDEO CODING

RELATED APPLICATIONS

This application claims the benefit of U.S. Provisional Application No. 63/218,820, filed Jul. 6, 2021, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for coding video data, including techniques for applying one or more forward and/or inverse transforms to video data. One problem in video codecs is the complexity of implementing inverse transforms given the large bit-width of multiply operations and the number of memory accesses. Some example techniques for addressing the multiplier bit-width issue require a video coder to implement several steps, which can cause processing challenges and increase complexity. The complexity challenges of implementing inverse transforms can increase when coding video data with higher and higher bit-depths.

As explained in more detail below, the process of inverse transforming coefficients may include applying a series of shift operations to the transform coefficients. These shifts may, for example, include a dequantization shift and a mid-transform short, described in more detail below. In some implementations, values for these shifts are dynamically determined by video encoders and video decoders without explicit signaling. Dynamically determining the shift values, however, requires a video decoder to store values for all of the transform coefficients in a buffer at a maximum possible bit-depth until values for all of the transform coefficients in a transform block are determined, which is a resource intensive process. According to the techniques of this disclosure, however, one or more syntax elements may be included in the bitstream to signal values for the shifts. By receiving in an encoded video bitstream of video data one or more syntax elements and determining a dequantization shift and a mid-transform shift based on the one or more syntax elements, the techniques of this disclosure may reduce the memory and processing requirements for devices performing video decoding.

According to an example of this disclosure, a method of decoding video data includes receiving encoded video data encoded at a first bit-depth; receiving in an encoded video bitstream for the video data one or more syntax elements; determining a dequantization shift and a mid-transform shift based on the one or more syntax elements; and performing an inverse transform of the encoded video data at a second bit-depth using the dequantization shift and the mid-transform shift to determine residual values for a block of video data, wherein the second bit-depth is different than the first bit-depth.

According to another example of this disclosure, a device for decoding video data includes a memory configured to store video data; one or more processors implemented in circuitry and configured to: receive encoded video data encoded at a first bit-depth; receive in an encoded video bitstream for the video data one or more syntax elements; determine a dequantization shift and a mid-transform shift based on the one or more syntax elements; and perform an inverse transform of the encoded video data at a second bit-depth using the dequantization shift and the mid-transform shift to determine residual values for a block of video data, wherein the second bit-depth is different than the first bit-depth.

The details of one or more examples are set forth in the accompanying drawings and the description below. Other features, objects, and advantages will be apparent from the description, drawings, and claims.

DETAILED DESCRIPTION

In general, this disclosure describes techniques for coding video data, including techniques for applying one or more forward and/or inverse transforms to video data. One problem in video codecs is the complexity of implementing inverse transforms given the large bit-width of multiply operations and the number of memory accesses. Some example techniques for addressing the multiplier bit-width issue require a video coder to implement several steps, which can cause processing challenges and increase complexity. The complexity challenges of implementing inverse transforms can increase when coding video data with higher and higher bit-depths.

The techniques of this disclosure enable inverse transform implementation at target, or legacy, bit-depths that are lower than the bit-depths of the signaled transform coefficients. In some examples, the bit-depth increase associated with extended precision video data (e.g., 18 bits for 12 bits) may be limited to the parsing and input to the dequantization process, while the inverse transform can be implemented at a lower (e.g., legacy) bit-depth than that used for signaling the coefficients.

As explained in more detail below, the process of inverse transforming coefficients may include applying a series of shift operations to the transform coefficients. These shifts may, for example, include a dequantization shift and a mid-transform short, described in more detail below. In some implementations, values for these shifts are dynamically determined by video encoders and video decoders without explicit signaling. Dynamically determining the shift values, however, requires a video decoder to store values for all of the transform coefficients in a buffer at a maximum possible bit-depth until values for all of the transform coefficients in a transform block are determined, which is a resource intensive process. According to the techniques of this disclosure, however, one or more syntax elements may be included in the bitstream to signal values for the shifts. By receiving in an encoded video bitstream of video data one or more syntax elements and determining a dequantization shift and a mid-transform shift based on the one or more syntax elements, the techniques of this disclosure may reduce the memory and processing requirements for devices performing video decoding.

Figure 1:
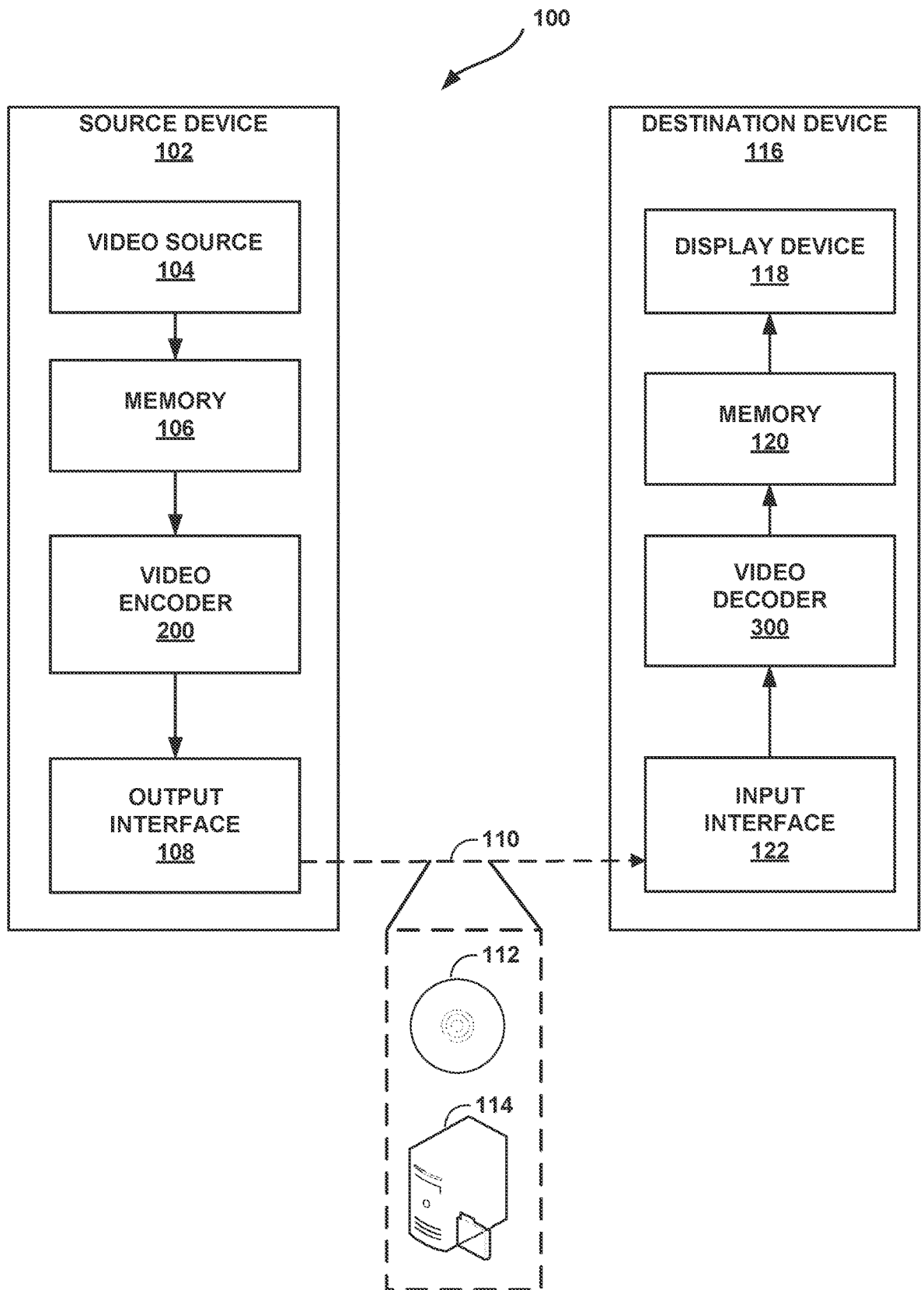
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for transform coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for transform coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use forward and/or inverse transforms.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit-depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, as will be explained in more detail below, video decoder 300 may be configured to receive encoded video data encoded at a first bit-depth, determine one or more of a dequantization shift (shift1) or a mid-transform shift (shift2) based on information in an encoded video bitstream, and perform an inverse transform of the encoded video data at a second bit-depth using the dequantization shift and the mid-transform shift, wherein the second bit-depth is lower than the first bit-depth.

A fundamental element of many video compression techniques is the use of a spatial transform to remove redundancy of residual signals. Prior to H.264, the inverse transform was specified with a rounding tolerance. Beginning with H.264 and continuing through some example subsequent standards, a bit exact calculation of the inverse transform and reconstruction processes was used. With the calculation, and hence dynamic range mandates, issues of additional complexity could result if excessive dynamic range were used in a normative inverse transform design. These include multiplication requiring more than 16-bits and the need to store values larger than 16-bits in a transpose buffer between separable transform stages. Limiting multiplies and memory storage to 16-bits is considered advantageous. During the development of H.264, the details of the inverse transform were specified, and it was confirmed that the result of a forward transform on residual data could not exceed 16-bits of dynamic range. It was possible for this dynamic range to be exceeded by manufactured, 'out-of-tolerance' bitstreams. This was prevented in H.264 by including some bitstream restrictions, such as:

"The bitstream shall not contain data that result in any element $f_{ij}$ of f with i, j=0 . . . 3 that exceeds the range of integer values from $-2(7+bitDepth)$ to $2(7+bitDepth)-1$, inclusive."

This dynamic range issue was addressed in HEVC through the use of a normative clip operation (Clip3) following dequantization (e.g., inverse quantization) and between separable transform stages in equation (8-274) below:

$$d[x][y]=\text{Clip3}(-32768,32767,((\text{TransCoeffLevel}[xTbY][yTbY][cIdx][x][y]*m[x][y]*\text{levelScale}[qP\%6]<<(qP/6))+(1<<(bd\text{Shift}-1)))>>bd\text{Shift})$$

Figure 2:
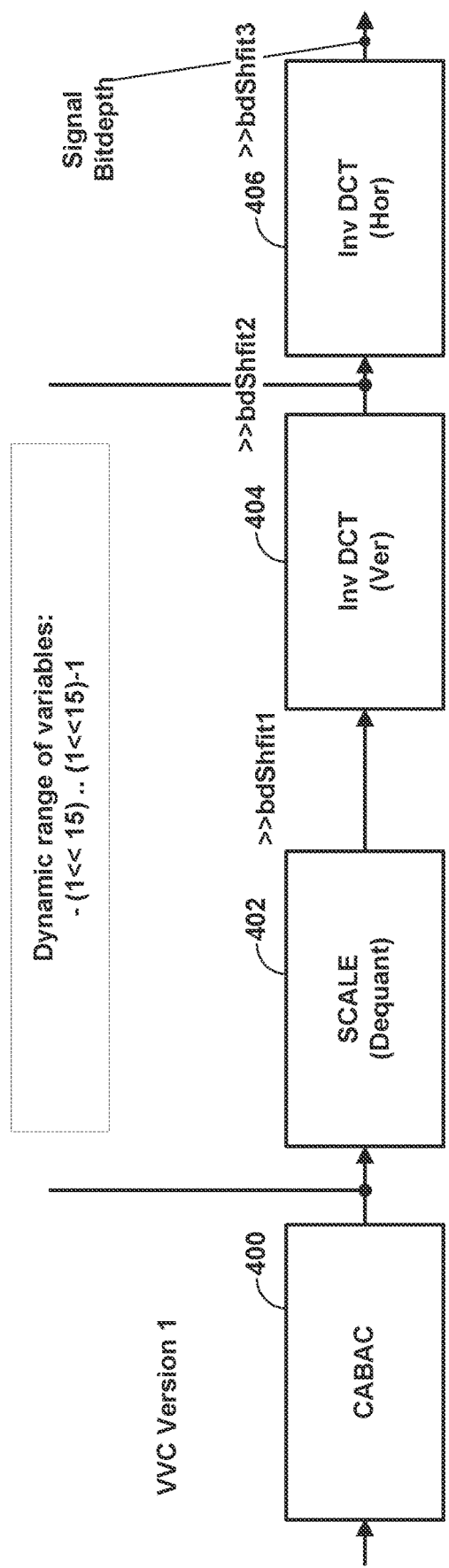
FIG. 2 is a block diagram illustrating an example inverse transform processing flow in VVC version 1.

A similar solution is used in VVC version 1 (v1), where a fixed internal precision of 16 bits is specified, and where the dynamic range of the magnitude of transform coefficients is expressed through Log 2TransformRange=15. FIG. 2 shows a block diagram of an inverse transform specified in VVC version 1. As shown in FIG. 2, the dynamic range of variables between the output of CABAC process 400 and the vertical inverse DCT 404 ranges from $-(1<<15)$ to $(1<<15)-1$, i.e., $-32{,}768$ to $32{,}767$, where << is a bitwise left shift. First, syntax elements representing transform coefficients are decoded by video decoder 300 using CABAC process 400. The transform coefficients are then scaled (e.g., dequantized) using scale process 402. After scale process 402, video decoder 300 may apply a bitwise right shift operation (>>) using a first shift value (bdShift1). Then video decoder 300 applies vertical inverse DCT 404 (Inv DCT (Ver)) to the scaled and shifted transform coefficients. Video decoder then applies a bitwise right shift operation (>>) using a second shift value (bdShift2) to the output of vertical inverse CT 404. Video decoder 300 then applies horizontal inverse DCT 406 (Inv DCT (Hor)) to produce residual values. Video decoder 300 may then apply a bitwise right shift operation (>>) to the transform coefficients using a third shift value (bdShift3). After this third shift operation, the residual values are at the signaled bit-depth.

As explained above, in VVC, three shift operations are used in the reconstruction of a residual signal. A first shift operation (shift1 or bdShift1) is applied immediately after dequantization (e.g., inverse quantization), a second shift operation (shift2 or bdShift2) is applied between separable primary transform stages (e.g., vertical and horizontal DCTs), and a third shift operation (shift3 or bdShift3) is applied after the inverse transform process to normalize the residual signal. In examples of the disclosure, the shift operation using shift1 may be referred to as a dequantization shift, as shift1 is applied after dequantization. The shift operation using shift2 may be referred to as a mid-transform shift, as shift2 is applied between separable stages of an inverse transform. The shift operating using shift3 may be referred to as a normalization shift, as shift3 is applied after the inverse transform process to normalize the residual signal.

According to VVC specification, the value of shift1 (bdShift1) is computed as:

$$bd\text{Shift}=\text{BitDepth}+\text{rectNonTsFlag}+((\text{Log }2(nTbW)+\text{Log }2(nTbH))/2)-5+sh\_dep\_quant\_used\_flag \quad (1133)$$

, where BitDepth indicates the BitDepth of a sample, nTbW is the width of the transform block, nTbH is the height of the transform block, sh_dep_quant_used_flag is a flag that indicates whether or not dependent quantization is used, and the value rectNonTsFlag is determine as follows:

$$\text{rectNonTsFlag}=(((\text{Log }2(nTbW)+\text{Log }2(nTbH))\&1)==1)?1:0$$

The value of shift2 (bdShift2) is fixed to 7, as indicated below:

$$g[x][y]=\text{Clip3}(\text{CoeffMin},\text{CoeffMax},(e[x][y]+64)>>>7) \quad (1163)$$

The value of shift3 (bdShift3) is computed as follows:

$$bd\text{Shift}=(nTbH>1\&\&nTbW>1)?(20-\text{BitDepth}):(21-\text{BitDepth}) \quad (1164)$$

When considering extensions of VVC to support High Bit-Depth Content, several mechanisms of enabling high bit-depth support in a codec may be employed. One such mechanism is to reuse the design specified in HEVC, where the internal precision of transform coefficients is specified as follows:

$$\text{Log }2\text{TransformRange}=\text{Max}(\text{BitDepth}+6,15)$$

In this case, the internal precision of transform coefficients being expressed with Log 2TransformRange will increase with an increase of an input bit-depth value. Such an increase of dynamic range in the calculations may be expensive from an implementation point of view and can be considered a drawback due to increasing the bit-width of multiplier and memory access. Another solution proposed is to introduce shifts to limit the dynamic range of intermediate values. Static shifts designed to avoid worst case dynamic range increases may be used with an associated reduction in calculation precision.

One example technique that alters the use of static shifts is the Content Adaptive Transform Precision (CATP) proposal described in K. Naser, et al. "AHG8: Content Adaptive Transform Precision for High Bit Depth Coding," Joint Video Experts Team (JVET) of ITU-T SG 16 WP 3 and ISO/IEC JTC 1/SC 29, $22^{nd}$ Meeting, by teleconference, 20-28 Apr. 2021, (hereinafter JVET-V0133). In JVET-V0133, it is recognized that static shifts may needlessly reduce precision when a right shift is larger than necessary. In JVET-V0133, the set of coefficients of each transform unit is analyzed during dequantization to determine the minimal shifts needed to preserve the desired dynamic range. Two different methods are used in JVET-V0133, called CATP0 and CATP1 (an extension of CATP0). The CATP0 method determines the dequantization shift based on the content of the video data and then modifies the other shifts accordingly. This technique does not limit the dynamic range between separable transform stages. The CATP1 method similarly determines the dequantization shift and determines the mid-transform shift based on the video content.

One problem in video codecs is the complexity of implementing inverse transforms given the large bit-width of multiply operations and the number memory accesses. The techniques of JVET-V0133 described above may be used to address the multiplier bit-width issue, but such techniques require the decoder to implement several steps which can cause undesirable processing challenges. Regarding complexity, the techniques of JVET-V0133 may undesirably result in additional computations needed at the decoder. Additionally, during the dequantization process, the value of the right shift used to dequantize the first coefficient of a TU is not known until all coefficients of a TU have been examined to determine the maximum dynamic range.

An alternative to a reference buffer is two-pass processing where the coefficients are first scanned to determine the coefficients with maximum magnitude and other statistics needed to determine the mid-transform shift. Following this initial scan, the shifts are determined and the dequantization can proceed. The need for a reference buffer is eliminated at the expense of using two passes through the coefficient data. Computing the mid-transform shift may depend upon specifics of the kernel used for the horizontal inverse transform.

During implementation of techniques related to JVET-V0133, some additional problems were identified. When the target bit-depth used for the transform may be less than the residual bit-depth, 1+ source bit-depth, negative values for the final right shift may be computed. For example, when video coding with 16-bit source data, which has 17-bit residual data, the operation of the prior invention may result in negative values calculated for the final normalization shift.

An additional processing stage, Low Frequency Non-Separable Transform (LFNST), may be applied in the decoder when indicated by the contents of the bitstream. When LFNST is applied, the processing bit-depth may increase when used directly with the techniques described above.

The techniques of this disclosure enable inverse transform implementation at target/legacy bit-depths which are lower than the bit-depths of the signaled transform coefficients. In some examples, the bit-depth increase associated with extended precision video data (e.g., 18 bits for 12 bits) will be limited to the parsing and input to the dequantization process, while the inverse transform can be implemented at a lower (e.g., legacy) bit-depth than that used for signaling the coefficients. The techniques of this disclosure include the use of operational bit-depth limits of the inverse transform, therefore achieving reduced complexity of inverse transform. In addition, the techniques of this disclosure allow for the possibility to reuse inverse transform modules (e.g., hardware and/or software) designed for a legacy bit-depth, even when using extended precision source data (e.g., at a bit-depth higher than the legacy bit-depth).

Aspects of the techniques of this disclosure are described below. The aspects of this disclosure may be used alone or in combination. The techniques of this disclosure are applicable for use with any video codec, video coding standard, or video coding format that uses inverse transforms, including future video coding standards, extensions to VVC, extensions to AV1, and/or successor video coding formats to AV1. The techniques of this disclosure are applicable for use with inverse transform processing. Accordingly, the techniques of this disclosure may be used both in a video decoder as well as in the reconstruction loop of a video encoder.

In a first example aspect of the disclosure, video encoder 200 may be configured to conduct analysis of transform coefficients and may signal control information (e.g., one or more syntax elements) to video decoder 300 indicating one or more shift values or indicating how shift values are to be determined. Contrary to techniques in JVET-V0133 which require a buffer at the video decoder and for the video decoder to perform analysis of all three shift values (e.g., shift1, shift2, and shift3), the techniques of this disclosure eliminate the need for a reference buffer by performing analysis for at least one of the shift values at video encoder 200.

In one example, video encoder 200 determines the values of shift1 and shift2 and sends control information (e.g., syntax elements) to video decoder 300 that indicates the value of shift1 and shift2. Video decoder 300 may then determine the value of shift3 from the values of shift1 and shift2. This is because shift3 normalizes the values of the result of the inverse transform back to the input bit-depth (e.g., a high bit-depth) after the application of shift1 and shift2 that allow the transform coefficients to be processed at a lower, legacy bit-depth.

In a second example, video encoder 200 determines the value of shift1 and sends control information (e.g., a syntax element) to video decoder 300 that indicates the value of shift1. Video decoder 300 may infer the value of shift2 from other information in the encoded video bitstream. For example, video decoder 300 may infer the value of shift2 from a syntax element that indicates a height and/or width of a transform unit (e.g., in general, the transform unit size). Video decoder 300 may then determine the value of shift3 from the values of shift1 and shift2.

In a third example, as an alternative to using a reference buffer, as in JVET-V0133, video decoder 300 may perform a two-pass processing where the quantized coefficients are first scanned to determine the coefficient(s) with maximum magnitude and other statistics needed to determine the mid-transform shift (e.g., shift2). Following this initial scan, video decoder 300 may determine the shift values and the dequantization can proceed. The need for a reference buffer is eliminated at the expense of using two passes through the coefficient data. In some examples, computing the mid-transform shift (e.g., shift2) may depend upon specifics of the kernel used for a horizontal inverse transform.

In another example, video decoder 300 may infer the value of shift2 from information in the encoded video bitstream. For example, video decoder 300 may infer the value of shift2 from a syntax element that indicates a height and/or width of a transform unit. Video decoder 300 may perform a simplified analysis of dequantized transform coefficients to determine the value of shift1. For example, video decoder 300 may determine the transform coefficient in a TU that has the largest number of bits, and then determines the value of shift1 based on this determined largest number of bits. Because video decoder 300 is only updating a value of the largest number of bits of the transform coefficients in a TU, there is no need to store all dequantized transform coefficients in a reference buffer, such as in the techniques of JVET-V0133. Accordingly, implementation complexity is reduced.

The techniques of the first example aspect enforce operational bit-depth limits of the inverse transform, and therefore achieve reduced complexity of inverse transforms, with the following additional benefits for implementation:

No need for an additional buffer for decoder side derivation, which is an improvement over alternative/competing designs (e.g., JVET-V0133).
   In some examples, no need for additional decoder side processing and latency due to a complex analysis stage, which is an improvement over alternative/competing designs (e.g., JVET-V0133).

In a second example aspect of the disclosure, video encoder 200 and video decoder 300 may be configured to enforce an operational bit-depth of the inverse transform to be constrained to a target bit-depth independently from the constraints on the signaled coefficient levels. In one example, enforcing such a constraint on the operational bit-depth of the inverse transform may include constraining a bitstream in signaling combination with signaled transform coefficients and signaled shifts. In another example, or in addition, enforcing such a constraint on the operational bit-depth of the inverse transform may include additional normative clipping at video decoder 300 prior to the inverse transform and between transform stages.

In this regard, VVC has clipping on the range of parsed coefficients (CMax) fixed to 115. In accordance with the techniques of this disclosure, video decoder 300 may clip the output of the parsed coefficients (CMax) fixed to larger than 15, e.g., bit-depth+6. Additionally, video decoder 300 may perform additional clipping on the input of the inverse transform (e.g., the output of dequantization with normalization shifts) and between transform stages to the target bit-depth, e.g., 15. In addition, the output of a low-frequency non-separable transform (LFNST) is clipped to the range indicated by the target bit-depth.

In summary, in one example of the disclosure, video decoder 300 may be configured to receive encoded video data encoded at a first bit-depth, determine one or more of a dequantization shift (shift1) or a mid-transform shift (shift2) based on information in an encoded video bitstream, and perform an inverse transform of the encoded video data at a second bit-depth using the dequantization shift and the mid-transform shift, wherein the second bit-depth is lower than the first bit-depth.

In one example, to determine one or more of the dequantization shift (shift1) or the mid-transform shift (shift2) based on information in the encoded video bitstream, video decoder 300 is further configured to determine the dequantization shift (shift1) and the mid-transform shift (shift2) based on syntax elements received in the encoded video bitstream.

In another example, to determine one or more of the dequantization shift (shift1) or the mid-transform shift (shift2) based on information in the encoded video bitstream, video decoder 300 is further configured to determine the dequantization shift (shift1) based on a syntax element received in the encoded video bitstream and determine the mid-transform shift (shift2) based on a transform unit height and/or width.

In another example, to determine one or more of the dequantization shift (shift1) or the mid-transform shift (shift2) based on information in the encoded video bitstream, video decoder 300 is further configured to analyze transform coefficients in a block of video data to identify a transform coefficient with a highest number of bits used to represent the transform coefficient, determine the dequantization shift (shift1) based on the highest number of bits used to represent the transform coefficient, and determine the mid-transform shift (shift2) based on a transform unit height and/or width.

In another example, video decoder 300 is further configured to determine quantized transform coefficients, inverse quantize the quantized transform coefficient to produce dequantized transform coefficients, apply the dequantization shift to the dequantized transform coefficients to create shifted dequantized transform coefficients, apply a first separable transform to the shifted dequantized transform coefficients to create first transform coefficients, apply the mid-transform shift (shift2) to the first transform coefficients to create first shifted transform coefficients, and apply a second separable transform to the first shifted transform coefficients to create residual values.

In another example, video decoder 300 is further configured to determine a normalization shift (shift3) based on the dequantization shift (shift1) and the mid-transform shift (shift2) and apply the normalization shift (shift3) to the residual values.

In another example, video decoder 300 is further configured to perform a clipping operation prior to one or more stages of the inverse transform based on the second bit-depth.

In another example, video encoder 200 is configured to determine one or more of a dequantization shift (shift1) or a mid-transform shift (shift2), and signal one or more syntax elements indicating the value of one or more of the dequantization shift (shift1) or the mid-transform shift (shift2).

In a first example of the disclosure, video encoder 200 may be configured to analyze transform coefficients and may signal control information (e.g., one or more syntax elements) to video decoder 300 indicating one or more shift values and/or indicating how shift values are to be determined by video decoder 300. Contrary to techniques in JVET-V0133 which require an extra buffer at the video decoder and for the video decoder to perform analysis transform coefficients to determine of all three shift values (e.g., the dequantization shift (shift1), mid-transform shift (shift2), and normalization shift (shift3)), the techniques of this disclosure reduce the need for a reference buffer by performing coefficient analysis for determining at least one of the shift values at video encoder 200.

In general, video decoder 300 may be configured to receive encoded video data encoded at a first bit-depth in an encoded video bitstream. As will be explained in more detail below, video decoder 300 may determine one or more of a dequantization shift (shift1) or a mid-transform shift (shift2) based on information in the encoded video bitstream, and perform an inverse transform on the encoded video data (e.g., a transform block of the video data) at a second bit-depth using the dequantization shift and the mid-transform shift, wherein the second bit-depth is lower than the first bit-depth.

In one example, video encoder 200 determines the values of shift1 and shift2 and sends control information (e.g., respective shift syntax elements) to video decoder 300 that indicates the values of the dequantization shift (shift1) and the mid-transform shift (shift2). Video decoder 300 may then determine the value of the normalization (shift3) from the values of the dequantization shift (shift1) and the mid-transform shift (shift2). This is because the normalization shift normalizes the values of the result of the inverse transform back to the input bit-depth (e.g., a high bit-depth) after the application of the dequantization shift and the mid-transform shift that allow the transform coefficients to be processed at a lower, legacy bit-depth. More details on how the shift values are determined are described below in the example implementation.

In general, in this example of the disclosure, to determine one or more of the dequantization shift (shift1) or the mid-transform shift (shift2) based on information in the encoded video bitstream, video decoder 300 is configured to determine the dequantization shift (shift1) and the mid-transform shift (shift2) based on respective syntax elements received in the encoded video bitstream. That is, video encoder 200 may signal a respective syntax element for each of the dequantization shift (shift1) and the mid-transform shift (shift2). Video decoder 300 may further determine a normalization shift (shift3) based on one or more of the dequantization shift and the mid-transform shift.

Figure 3A:
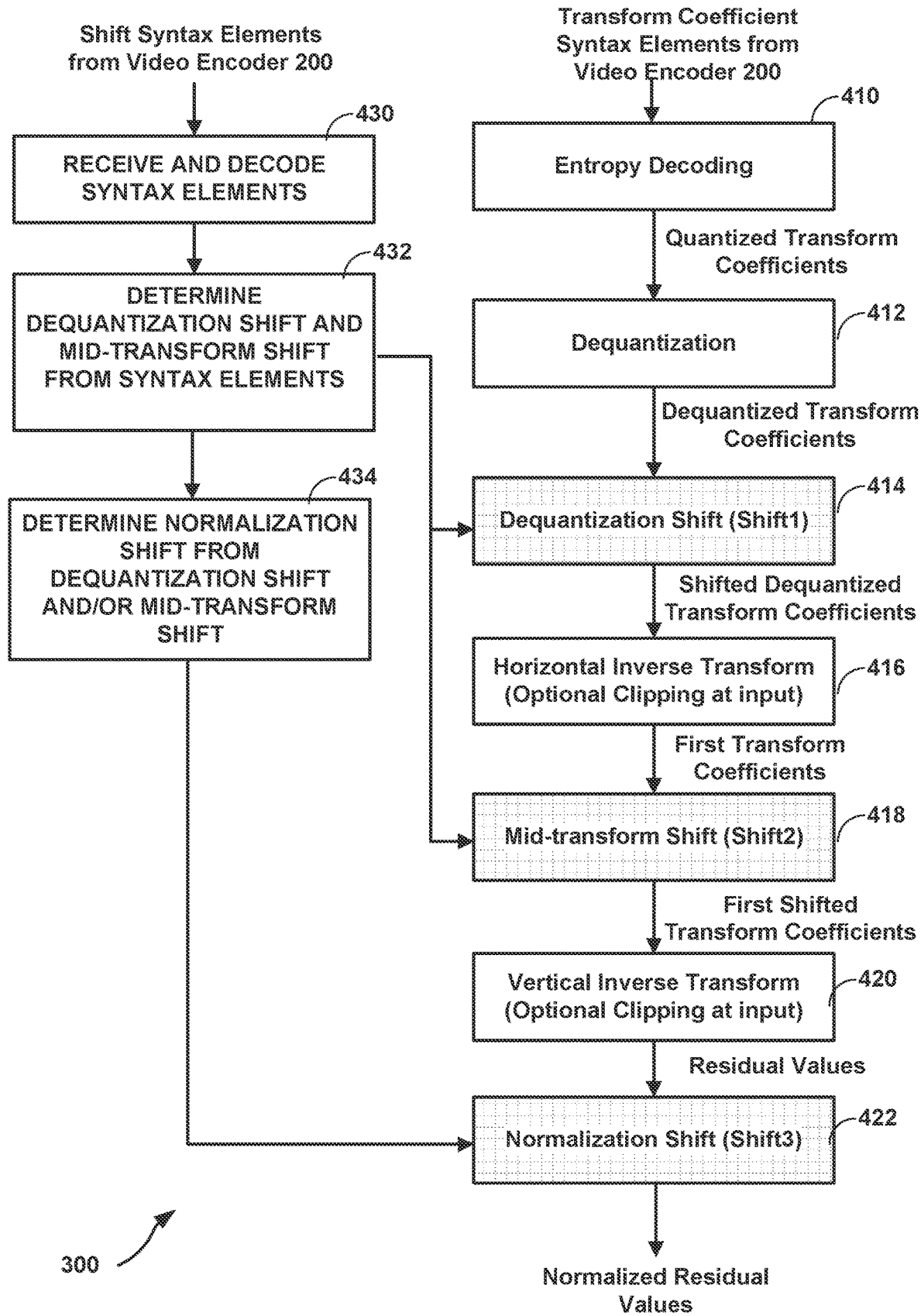
FIG. 3A is a block diagram illustrating an example process for performing an inverse transform in accordance with one example of the disclosure.

FIG. 3A is a block diagram illustrating an example process for performing an inverse transform in accordance with one example of the disclosure. Video decoder 300 is configured to perform the process of FIG. 3A. Video decoder 300 may receive and decode syntax elements (430) received from video encoder 200. That is, video encoder 200 may be configured to determine values for the dequantization shift (shift1) and the mid-transform shift (shift2) and signal respective syntax elements that indicate the values for each of these shift values. The syntax elements may indicate the shift values directly, be indexes to a table of shift values, and/or specify techniques for how video decoder 300 is to determine the shift values. Video decoder 300 may then determine the dequantization shift (shift1) and the mid-transform shift (shift2) from the syntax elements (432). Video decoder 300 may further determine a normalization shift value (shift3) from the dequantization shift (shift1) and the mid-transform shift (shift2) (434).

Video decoder 300 may further receive transform coefficient syntax elements from video encoder 200 as part of process of performing an inverse transform to reconstruct residual values. Video decoder 300 may perform entropy decoding (410) on the transform coefficient syntax elements to produce quantized transform coefficients. The quantized transform coefficients may represent transform coefficients for a transform block of video data. Video decoder 300 may then perform dequantization (412) on the quantized transform coefficients to produced dequantized transform coefficients. Video decoder 300 may further perform a dequantization shift (414) on the dequantized transform coefficients using the determined dequantization shift value (shift1) to produce shifted dequantized transform coefficients. As described above, the dequantization shift may be implemented as bitwise right shift operation (>>).

Video decoder 300 may then perform an inverse transform process on the shifted dequantized transform coefficients. In the example, of FIG. 3A, the inverse transform process includes two stages of separable transform: a horizontal inverse transform and a vertical transform. FIG. 3A shows the horizontal inverse transform being performed first, but in other examples the order may be reversed. Video decoder 300 may perform a horizontal inverse transform (416) on the shifted dequantized transform coefficients to produce first transform coefficients (e.g., intermediate transform coefficients). As will be explained in more detail below, in some examples, video decoder 300 may be configured to perform a clipping operation on the inputs to the horizontal inverse transform.

After the horizontal inverse transform, video decoder 300 may apply a mid-transform shift (418) to the first transform coefficients using the determined mid-transform shift value (shift2) to produce first shifted transform coefficients. As described above, the mid-transform shift may be implemented as bitwise right shift operation (>>). Video decoder 300 may then perform a vertical inverse transform (420) on the first transform coefficients to produce residual values. As will be explained in more detail below, in some examples, video decoder 300 may be configured to perform a clipping operation on the inputs to the vertical inverse transform.

Video decoder 300 may then perform a normalization shift (422) on the residual values using the determined normalization shift (shift3) to produced normalized residual values. The normalized residual values are then back in the bit-depth of the original transform coefficients (i.e., a higher bit-depth) before the dequantization and mid-transform shifts. Video decoder 300 may then perform one or more prediction processes (e.g., inter prediction, intra prediction, or other) on the normalized residual values to reconstruct a block of video data.

In a second example, video encoder 200 determines the value of the dequantization shift (shift1) and sends control information (e.g., a syntax element) to video decoder 300 that indicates the value of the dequantization shift. Video decoder 300 may infer the value of the mid-transform shift (shift2) from other information in the encoded video bitstream. For example, video decoder 300 may infer the value of the mid-transform shift (shift2) from another syntax element or variable that indicates a height and/or width of a transform unit (e.g., in general, the transform unit size). Video decoder 300 may then determine the value of the normalization shift (shift3) from the values of the dequantization shift (shift1) and the mid-transform shift (shift2).

In general, to determine one or more of the dequantization shift or the mid-transform shift based on information in the encoded video bitstream, video decoder 300 is configured to determine the dequantization shift based on a syntax element received in the encoded video bitstream and determine the mid-transform shift based on at least one of a transform unit height or width.

Figure 3B:
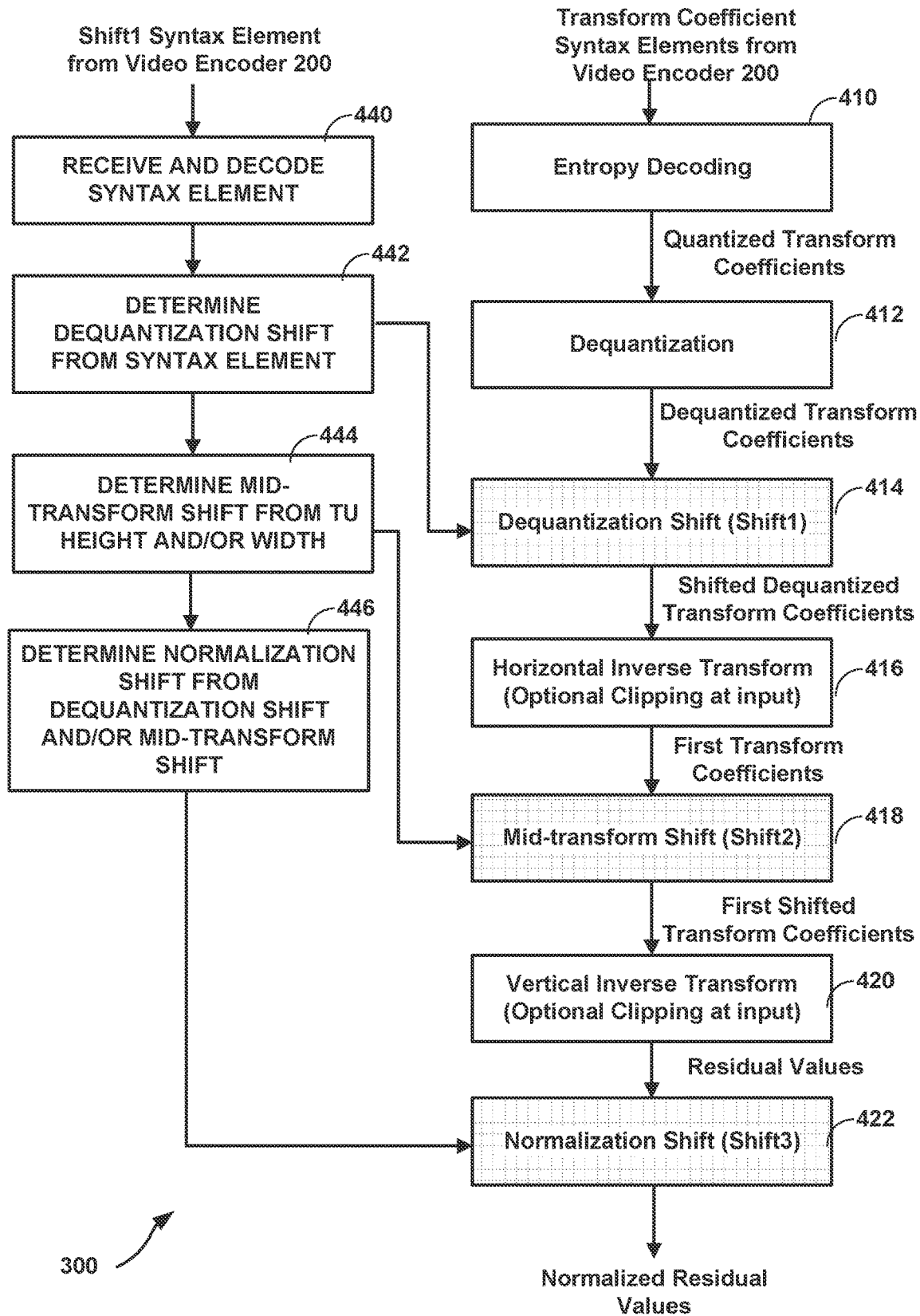
FIG. 3B is a block diagram illustrating an example process for performing an inverse transform in accordance with another example of the disclosure.

FIG. 3B is a block diagram illustrating an example process for performing an inverse transform in accordance with another example of the disclosure. Video decoder 300 is configured to perform the process of FIG. 3B. Video decoder 300 may receive and decode a syntax element (440) received from video encoder 200. That is, video encoder 200 may be configured to determine a value for the dequantization shift (shift1) and signal a syntax element that indicates the value. The syntax element may indicate the shift value directly, be indexes to a table of shift values, and/or specify techniques for how video decoder 300 is to determine the shift value. Video decoder 300 may then determine the dequantization shift (shift1) from the syntax element (442).

Video decoder 300 may further determine the mid-transform shift (shift2) from the transform unit (or transform block) height and/or width (444). Video decoder 300 may further determine a normalization shift value (shift3) from the dequantization shift (shift1) and the mid-transform shift (shift2) (446). Video decoder 300 may then perform an inverse transform process using the determined shift values in the same manner as described above with reference to FIG. 3A.

In a third example, as an alternative to using a reference buffer, as in JVET-V0133, video decoder 300 may perform a two-pass processing technique where the quantized coefficients are first scanned to determine the coefficient(s) with maximum magnitude and other statistics needed to determine the mid-transform shift (e.g., shift2). Following this initial scan, video decoder 300 may determine the shift values and the dequantization can proceed. The need for a reference buffer is eliminated at the expense of using two passes through the coefficient data. In some examples, computing the mid-transform shift (e.g., shift2) may depend upon the specifics of the kernel used for a horizontal inverse transform. In other examples, computing the mid-transform shift (e.g., shift2) may depend upon the transform unit height and/or width.

In another example, video decoder 300 may infer the value of the mid-transform shift (shift2) from information in the encoded video bitstream. For example, video decoder 300 may infer the value of the mid-transform shift (shift2) from a syntax element that indicates a height and/or width of a transform unit. Video decoder 300 may perform a simplified analysis of dequantized transform coefficients to determine the value of the dequantization shift (shift1). For example, video decoder 300 may determine the transform coefficient in a TU that has the largest number of bits, and then determines the value of the dequantization shift (shift1) based on this determined largest number of bits. Because video decoder 300 is only updating a value of the largest number of bits of the transform coefficients in a TU, there is no need to store all dequantized transform coefficients in a reference buffer, such as in the techniques of JVET-V0133. Accordingly, implementation complexity is reduced.

Figure 3C:
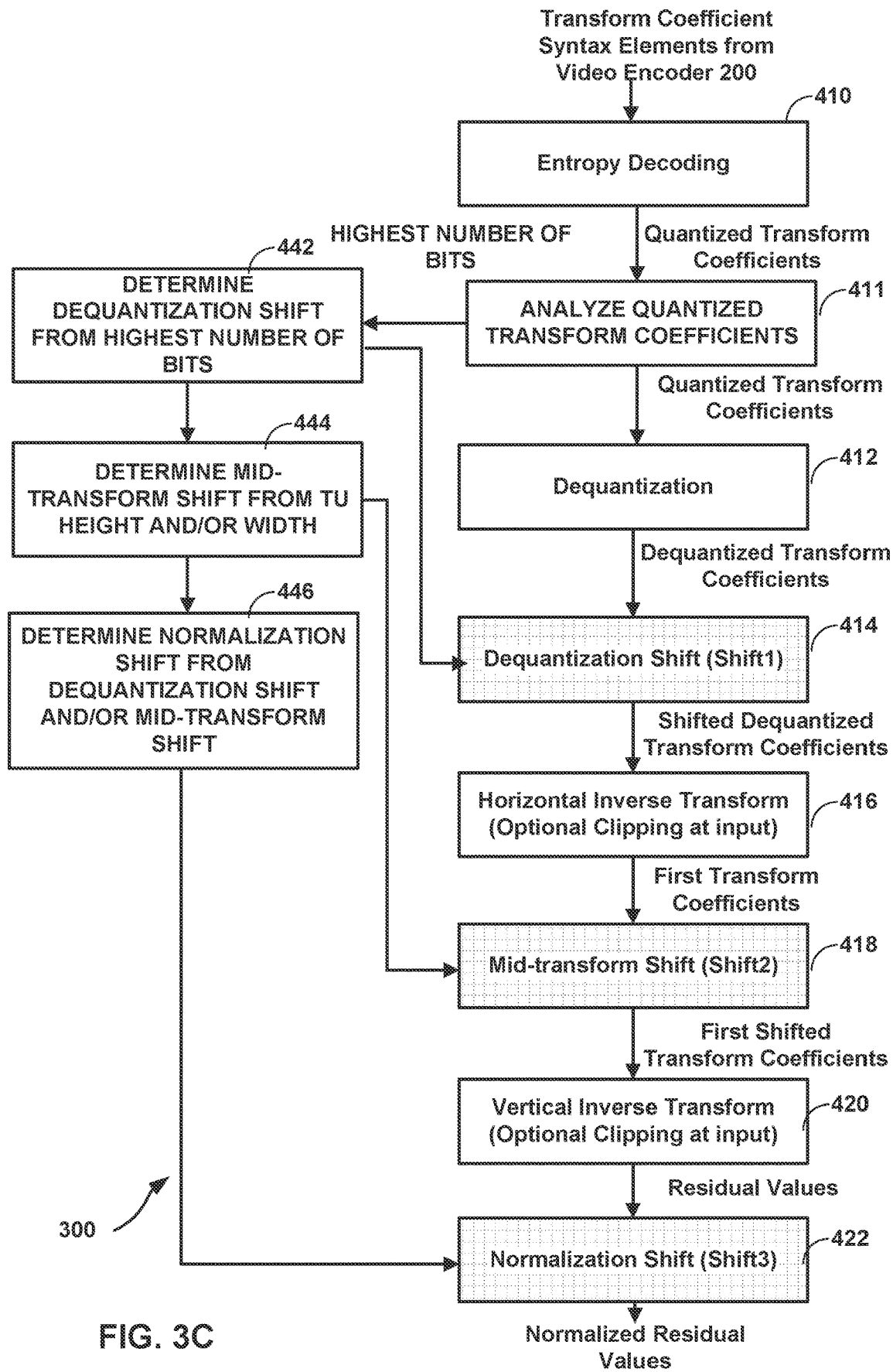
FIG. 3C is a block diagram illustrating an example process for performing an inverse transform in accordance with another example of the disclosure.

FIG. 3C is a block diagram illustrating an example process for performing an inverse transform in accordance with another example of the disclosure. In the example of FIG. 3C, video decoder 300 is configured to perform the two-pass processing of quantized transform coefficients as described above. Video decoder 300 may receive transform coefficient syntax elements from video encoder 200 as part of process of performing an inverse transform to reconstruct residual values. Video decoder 300 may perform entropy decoding (410) on the transform coefficient syntax elements to produce quantized transform coefficients. The quantized transform coefficients may represent transform coefficients for a transform block of video data.

Video decoder 300 may then analyze the quantized transform coefficients (411) to determine a transform coefficient with the highest number of bits. This differs than performing analysis following dequantization, e.g., as in JVET-V0133. The techniques of FIG. 3C avoids the need to buffer dequantized transform coefficients, as in JVET-V0133. Video decoder 300 may then use this highest number of bits to determine the dequantization shift value (442). Video decoder 300 may determine the mid-transform shift (shift2) from a transform unit (or transform block) height and/or width (444). As above, video decoder 300 may determine the normalization shift (shift3) from the dequantization shift and/or mid-transform shift (446). Video decoder 300 may then perform an inverse transform process using the determined shift values in the same manner as described above with reference to FIG. 3A.

The techniques of Aspect 1 enforce operational bit-depth limits of the inverse transform, and therefore achieve reduced complexity of inverse transforms, with the following additional benefits for implementation:

- No need for an additional buffer for decoder side derivation, which is an improvement over alternative/competing designs (e.g., JVET-V0133).
- In some examples, dynamic range limits may be enforced by using clipping operations. This technique may better ensure the dynamic range using limited complexity analysis, where such analysis may not need to examine all corner cases to generate a shift value.

In one implementation of the first example aspect introduced above, video encoder 200 may employ signaling to avoid the issues of increased decoder side complexity associated decoder side derivation (e.g., as in JVET-V0133). In one example, video decoder 300 derives the dequantization and mid-transform shift values based on information (e.g., syntax element(s)) signaled in the bitstream or by predicting the shift value(s) at the decoder side from syntax elements associated with a current TU, or from other TUs in a spatial or temporal neighborhood. Since the shift values are signaled in the bitstream prior to the coefficient values, video decoder 300 does not need to compute the shift values from coefficient values yet to be decoded and can compute the dequantization shift (e.g., shift1) before the coefficient levels are decoded.

In another example, video encoder 200 may not signal shift offsets in the bitstream, but video decoder 300 may derive the dequantization and/or mid-transform shift values from syntax elements of the bitstream available before the dequantization of individual coefficients, which also avoids the need to buffer for an analysis stage. The three current shifts specified in VVC version 1 are denoted shift1 or dequantization shift (shift at end of dequantization), shift2 or mid-transform shift (shift between separable transform stages), and shift3 (normalization shift). In VVC, a clipping process is performed following each of these shifts and such clipping may remain unaltered and may use the same constants as in VVC. These shifts may be determined for individual color components or types of color components i.e., Luma versus Chroma.

For each TU, or group of TUs, video encoder 200 may analyze the associated transform coefficients, compare the transform coefficients against the target internal bit-depth, expressed as Log 2TransformRange2, e.g., 15 bits for VVC v1, and derive for each block an adjustment to the default decoder side values of shift1, shift2 and shift3, such that target internal bit-depth requirements for the inverse transform would be met even if the maximum magnitude of a signaled transform coefficient will fall outside of the dynamic range specified by $\{-(1<<\text{Log 2TransformRange2}), (1<<\text{Log 2TransformRange2})-1\}$.

The difference between adjusted shifts derived at video encoder 200 and default shifts specified by the VVC specification for target implementation can be signaled in the bitstream corresponding to the TU.

In another example, the value of the dequantization shift (shift1) may be signaled per group of TUs, CU, per tiles, per slice, per picture or group of pictures and may be signaled as follows:

$$\text{DequantizationShift}_{adaptive} = \text{shift}_1 + \text{delta}_1$$

with $\text{shift}_1$ being a fixed value and $\text{delta}_1$ being a signaled value.

In one example, video encoder 200 may calculate the value of DequantizationShift as:

$$\text{DequantizationShift}_{adaptive} = \text{ceil}(\log_2(|\text{MaxCoeff}|)) - \text{TargetBitdepth}$$

Additionally, the value of a difference between the mid-transform shift may be signaled in addition to the value of the dequantization shift.

The value of the mid-transform shift (shift2) may be set equal to the mid-transform shift used in VVC. In another example, the mid-transform shift (shift2) may be computed from the transform unit height and/or width signaled in the bitstream. In another example, the mid-transform shift may be selected at video encoder 200 and the difference between the mid-transform shift of VVC and the selected mid-transform shift may be signaled. The mid-transform shift may be signaled at a TU, CTU, slice, or picture level, similarly to the dequantization shift. The value $\text{delta}_2 = 0$ if this is not signaled.

$$\text{MidTransformShift}_{adaptive} = \text{shift}_2 + \text{delta}_2$$

$$\text{MidTransformShift}_{adaptive} = 7 + \log 2(\text{TransformHeight})$$

The value of the final normalization shift (shift3) is determined from the values of the original three shifts ($\text{shift}_1$=dequantization, $\text{shift}_2$=mid-transform, and $\text{shift}_3$=normalization shifts) and the adaptive dequantization shift and the adaptive mid-transform shift by the preservation of the sum of the original and modified shifts. as shown below.

$$\text{NormalizationShift}_{adaptive} = \text{shift}_1 + \text{shift}_2 - (\text{delta}_1 + \text{delta}_2)$$

$$\text{NormalizationShift}_{adaptive} = \text{shift}_3 + (\text{shift}_1 - \text{DequantizationShift}_{adaptive}) + (\text{shift}_2 - \text{MidTransformShift}_{adaptive})$$

In some examples, the offsets delta1 and delta2 will have a limited range such as [0,3] and may be binarized via truncated unary binarization or other binarization appropriate for a low range signal. Since the distribution of values for the signals delta1 and delta2 may be nonuniform, context coding may be used to encode these values.

In some examples, delta1, delta2 pair can be tabulated, and video encoder 200 may identify the pair by signaling the index. In some examples, delta1 and delta2 can be derived or predicted from other blocks in a spatial and/or temporal neighborhood. In some examples, context for coding of these syntax elements may be predicted from neighboring blocks.

The clipping operations following dequantization, between transform stages, and following normalization may be kept. In other examples, a bitstream constraint may be imposed restricting the coefficient values based on the signaled values of delta1 and delta2.

In some examples, the dynamic range of signaled transform coefficients can be specified (e.g., either fixed in specification or derived from the bitstream syntax elements) to a certain value Log 2TransformRange1, whereas the internal precision of the decoding operations can be specified (e.g., fixed or derived from syntax elements of the bitstream) to another value Log 2Transform2. In some examples, the bitstream can be constrained such that the maximal magnitude of signaled transform coefficients MaxCoef cannot exceed a value derived through 1<<Log 2Transform1. The signaled value of delta1/delta2 shall follow a constraint similar to the following:

$$\text{Ceil}(\text{Log 2}(\text{MaxCoef})) - \text{delta1} <= \text{Log 2Transform2}.$$

In some examples, the value Log 2Transform2 value being utilized in specifying the internal bit-depth of inverse transform can be different from the variable of Log 2Transform1 being utilized for signaling transform coefficients and for deriving parameters of entropy coding, e.g., Exponential-Golomb coding. For example:

$$\text{truncSuffixLen} = \text{Log 2TransformRange1}$$

$$\text{maxPreExtLen} = 26 - \text{Log 2TransformRange1}$$

Example optimizations of the above example implementation are described below.

Video encoder 200 may be configured to include rounding offsets with each of the right shifts described. (x)>>n may be replaced by (x+(1<<(n-1)))>>n when the shift n is greater than 2.

Two modifications of the calculations of shifts used in this example implementation are described to support extreme source bit-depth with limited targetBitDepth.

In a first example modification, the calculation of DequantizationShift$_{adaptive}$ may be modified based on the difference between SourceBitDepth and TargetBitDepth. The value of MidTransformShift$_{adaptive}$ shift is unchanged and the calculation of NormalizationShift$_{adaptive}$ is unchanged.

If SourceBitdepth<TargetBitdepth $$\text{DequantizationShift}_{adaptive} = \text{ceil}(\log_2(|\text{MaxCoeff}|)) - \text{TargetBitdepth}$$

else $$\text{DequantizationShift}_{adaptive} = \text{ceil}(\log_2(|\text{MaxCoeff}|)) - \text{TargetBitdepth} - (\text{SourceBitdepth} - \text{TargetBitdepth})$$

In a second example modification, the shift calculations may be unchanged, but the operation of a negative value for the final normalization shift is clarified. When NormalizationShift$_{adaptive}$<0, right shift may be ambiguous. This ambiguity is resolved by replacing calculation with a defined operation.

When NormalizationShift$_{adaptive}$<0 the right shift by NormalizationShift$_{adaptive}$ is replaced by a left shift by $-$NormalizationShift$_{adaptive}$ with no rounding offset In a third example modification, the mid transform shift may be modified based on the difference between SourceBitDepth and TargetBitDepth, the value of DequantizationShift$_{adaptive}$ shift is unchanged, and the calculation of NormalizationShift$_{adaptive}$ is unchanged.

If SourceBitdepth<TargetBitdepth $$\text{MidTransformShift}_{adaptive} = 7 + \log 2(\text{TransformHeight})$$

else $$\text{MidTransformShift}_{adaptive} = 7 + \log 2(\text{TransformHeight}) - (\text{SourceBitdepth} - \text{TargetBitdepth})$$

In a fourth example modification, the mid transform shift is modified so that the normalization shift is non-negative.

$$\text{MidTransformShift}_{adaptive} = \min(7 + \log 2(\text{TransformHeight}), \text{shift}_1 + \text{shift}_2 + \text{shift}_3 - \text{DequantizationShift}_{adaptive})$$

In one example implementation of the second example aspect introduced above, video encoder 200 and video decoder may be configured to use additional clipping on inverse transform (invTransf) input samples which may be different from the CMax of signaled coefficients. VVC version1 describes the following:

It is a requirement of bitstream conformance that the value of dec_abs_level[n] shall be constrained such that the corresponding value of TransCoeffLevel[x0][y0][cIdx][xC][yC] is in the range of CoeffMin to CoeffMax, inclusive.

The (nTbW)×(nTbH) array dz is set equal to the (nTbW)×(nTbH) array TransCoeffLevel[xTbY][yTbY][cIdx].

If BdpcmDir[xTbY][yYbY][cIdx] is equal to 0 and x is greater than 0, the following applies:

$$dz[x][y] = \text{Clip3}(\text{CoeffMin}, \text{CoeffMax}, dz[x-1][y] + dz[x][y]) \tag{1143}$$

Otherwise, if BdpcmDir[xTbY][yTbY][cIdx] is equal to 1 and y is greater than 0, the following applies:

$$dz[x][y] = \text{Clip3}(\text{CoeffMin}, \text{CoeffMax}, dz[x][y-1] + dz[x][y]) \tag{1144}$$

The variables CoeffMin and CoeffMax specifying the minimum and maximum signaled transform coefficient values and utilized as input for inverse transform TransCoeffLevel[xTbY][yTbY][cIdx] are derived as follows:

$$\text{CoeffMin} = -(1<<15) \tag{189}$$

$$\text{CoeffMax} = (1<<15) - 1 \tag{190}$$

In contrast, according to the techniques of this disclosure, one set of values for CoeffMin/CoeffMax (e.g., CoeffMin1/

CoeffMax1) is utilized for clipping/conformance after the parsing process. This set of values can be set to a first range of values, larger than target bit-depth, e.g., set to 18 (CoeffMin1=$-2^{17}$, CoeffMax1=$2^{17}-1$) for 12-bit data, or to 22 (CoeffMin1=$-2^{21}$, CoeffMax1=$2^{21}-1$) for 16-bit data.

Whereas a second set of values for CoeffMin/CoeffMax (e.g., CoeffMin2/CoeffMax2) is utilized for clipping/(conformance on combination of coefficient and signaled control information) on the input to an inverse transform, which may be set to a second range of values at a target bit-depth, e.g., set to 16 (CoeffMin2=$-2^{15}$, CoeffMax2=$2^{15}-1$) for 12-bit data or 16-bit data.

The techniques of this disclosure further include a modification of the clipping operations following dequantization (e.g., inverse quantization), or inverse low frequency non-separable transform (LFNST), and the first stage of an inverse primary transform. In accordance with the techniques of this disclosure, the clipping operations are independent of bit-depth. Code examples from modified VTM (VVC Test Model) software are shown below. The code in three functions is modified based on the selection of a macro QC_LIMIT_IT_CALCULATION_16_SIGNED_BITS and the constant value 15. Note in the VTM software, maxLog 2TrDynamicRange is altered based on bit-depth. This alteration is used to control the entropy coding in addition to the transform calculation, so merely changing the value of maxLog 2TrDynamicRange is ineffective.

```
Quantizer::dequantBlock
#if
    QC_LIMIT_IT_CALCULATION_16_SIGNED_BITS
    const TCoeff minTCoeff=-(1<<<15);
    const TCoeff maxTCoeff=(1<<<15)-1;
#else
    const TCoeff minTCoeff=-(1<<maxLog 2TrDynamicRange);
    const TCoeff maxTCoeff=(1<<maxLog 2TrDynamicRange)-1;
#endif
TrQuant::invLfnstNxN
#if
    QC_LIMIT_IT_CALCULATION_16_SIGNED_BITS
    const TCoeff outputMinimum=-(1<<15);
    const TCoeff outputMaximum=(1<<15)-1;
#else
    const TCoeff outputMinimum=-(1<<maxLog 2TrDynamicRange);
    const TCoeff outputMaximum=(1<<maxLog 2TrDynamicRange)-1;
#endif
TrQuant::xIT
#if
QC_LIMIT_IT_CALCULATION_16_SIGNED_BITS
    const TCoeff clipMinimum=-(1<<<15);
    const TCoeff clipMaximum=(1<<<15)-1;
#else
    const TCoeff clipMinimum=-(1<<maxLog 2TrDynamicRange);
    const TCoeff clipMaximum=(1<<maxLog 2TrDynamicRange)-1;
#endif
```

In summary, in one example of the disclosure, video decoder 300 may be configured to receive encoded video data encoded at a first bit-depth, determine one or more of a dequantization shift (shift1) or a mid-transform shift (shift2) based on information in an encoded video bitstream, and perform an inverse transform of the encoded video data at a second bit-depth using the dequantization shift and the mid-transform shift, wherein the second bit-depth is lower than the first bit-depth.

In one example, to determine one or more of the dequantization shift (shift1) or the mid-transform shift (shift2) based on information in the encoded video bitstream, video decoder 300 is further configured to determine the dequantization shift (shift1) and the mid-transform shift (shift2) based on syntax elements received in the encoded video bitstream.

In another example, to determine one or more of the dequantization shift (shift1) or the mid-transform shift (shift2) based on information in the encoded video bitstream, video decoder 300 is further configured to determine the dequantization shift (shift1) based on a syntax element received in the encoded video bitstream and determine the mid-transform shift (shift2) based on a transform unit height and/or width.

In another example, to determine one or more of the dequantization shift (shift1) or the mid-transform shift (shift2) based on information in the encoded video bitstream, video decoder 300 is further configured to analyze quantized transform coefficients in a block of video data to identify a transform coefficient with a highest number of bits used to represent the transform coefficient, determine the dequantization shift (shift1) based on the highest number of bits used to represent the transform coefficient, and determine the mid-transform shift (shift2) based on a transform unit height and/or width.

In another example, video decoder 300 is further configured to determine quantized transform coefficients, inverse quantize the quantized transform coefficient to produce dequantized transform coefficients, apply the dequantization shift to the dequantized transform coefficients to create shifted dequantized transform coefficients, apply a first separable transform to the shifted dequantized transform coefficients to create first transform coefficients, apply the mid-transform shift (shift2) to the first transform coefficients to create first shifted transform coefficients, and apply a second separable transform to the first shifted transform coefficients to create residual values.

In another example, video decoder 300 is further configured to determine a normalization shift (shift3) based on the dequantization shift (shift1) and the mid-transform shift (shift2) and apply the normalization shift (shift3) to the residual values.

In another example, video decoder 300 is further configured to perform a clipping operation prior to one or more stages of the inverse transform based on the second bit-depth.

In another example, video encoder 200 is configured to determine one or more of a dequantization shift (shift1) or a mid-transform shift (shift2), and signal one or more syntax elements indicating the value of one or more of the dequantization shift (shift1) or the mid-transform shift (shift2).

Figure 4:
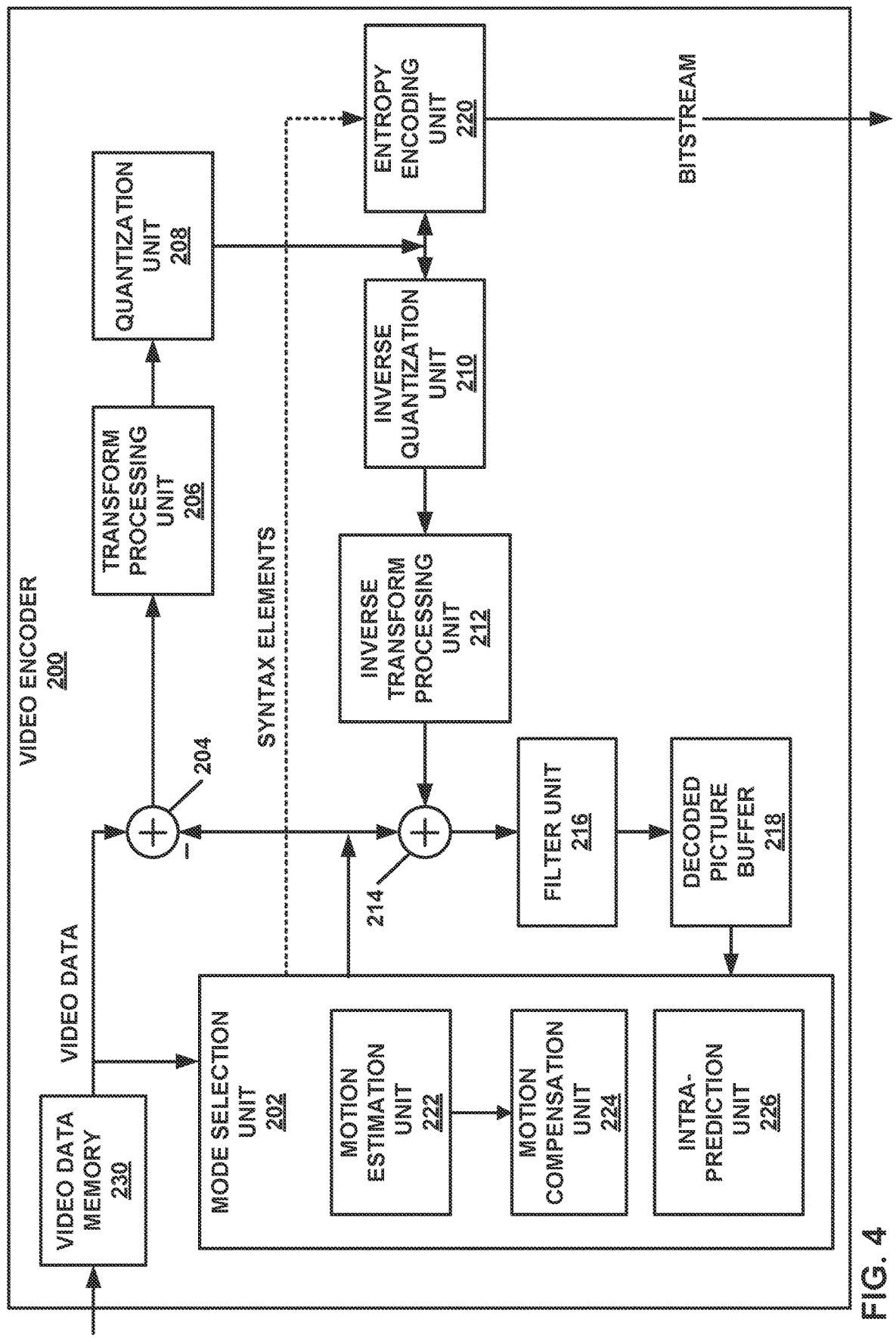
FIG. 4 is a block diagram illustrating an example video encoder that may perform the techniques of this disclosure.

FIG. 4 is a block diagram illustrating an example video encoder 200 that may perform the techniques of this disclosure. FIG. 4 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 4, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 4 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the MTT structure, QTBT structure, superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered.

Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

In addition, inverse transform processing unit 212 may be configured to perform any of the techniques described above. For example, inverse transform processing unit 212 may be configured to receive encoded video data encoded at a first bit-depth, determine one or more of a dequantization shift (shift1) or a mid-transform shift (shift2), and perform an inverse transform of the encoded video data at a second bit-depth using the dequantization shift and the mid-transform shift, wherein the second bit-depth is lower than the first bit-depth.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine one or more of a dequantization shift (shift1) or a mid-transform shift (shift2), and signal one or more syntax elements indicating the value of one or more of the dequantization shift (shift1) or the mid-transform shift (shift2).

Figure 5:
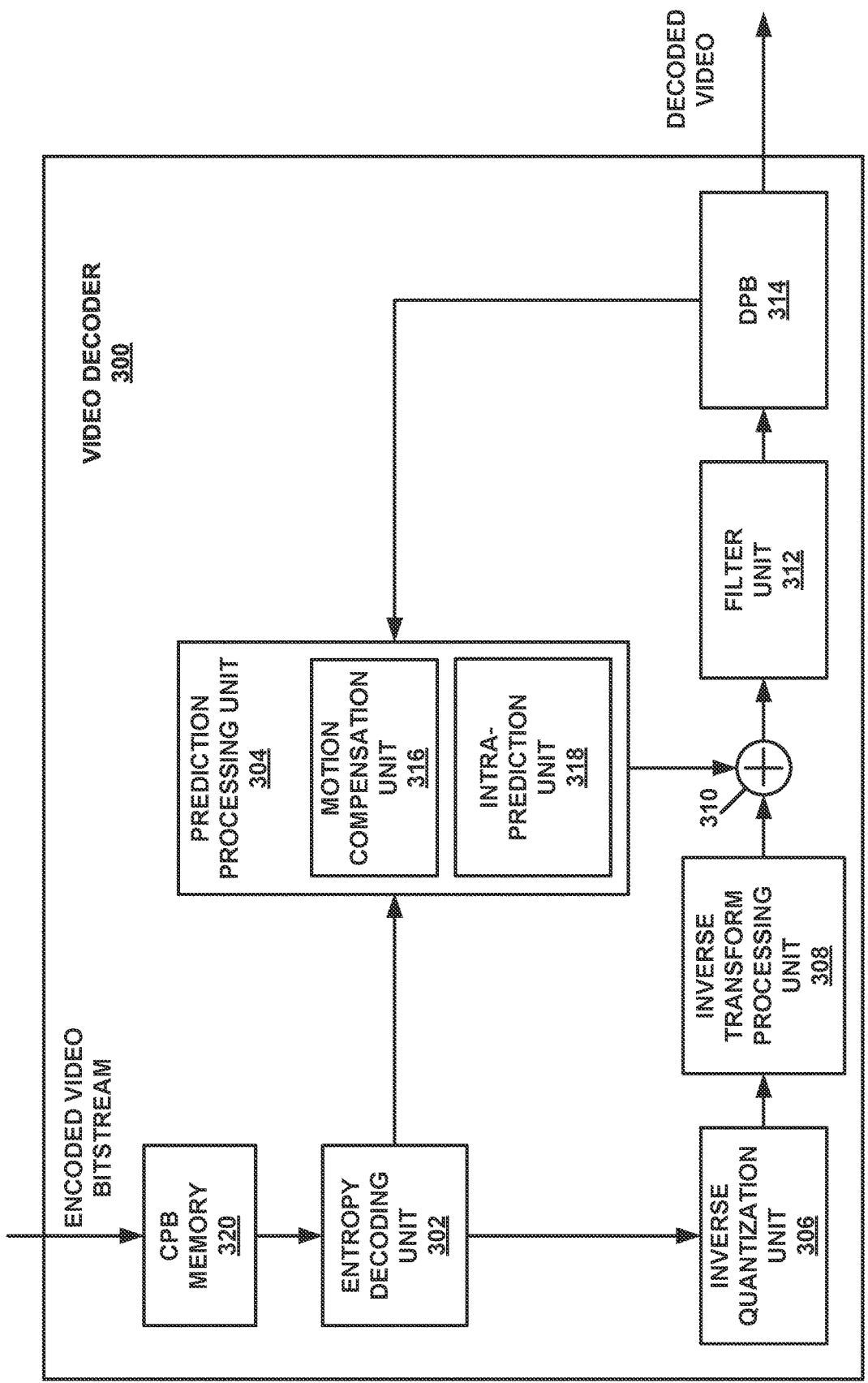
FIG. 5 is a block diagram illustrating an example video decoder that may perform the techniques of this disclosure.

FIG. 5 is a block diagram illustrating an example video decoder 300 that may perform the techniques of this disclosure. FIG. 5 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 5, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 5 are illustrated to assist with understanding the operations performed by video decoder 300. The units may be implemented as fixed-function circuits, programmable circuits, or a combination thereof. Similar to FIG. 4, fixed-function circuits refer to circuits that provide particular functionality, and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

In addition, inverse transform processing unit 308 may be configured to perform any of the techniques described above. For example, inverse transform processing unit 308 may be configured to receive encoded video data encoded at a first bit-depth, determine one or more of a dequantization shift (shift1) or a mid-transform shift (shift2) based on information in an encoded video bitstream, and perform an inverse transform of the encoded video data at a second bit-depth using the dequantization shift and the mid-transform shift, wherein the second bit-depth is lower than the first bit-depth.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 4).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 4). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to receive encoded video data encoded at a first bit-depth, determine one or more of a dequantization shift (shift1) or a mid-transform shift (shift2) based on information in an encoded video bitstream, and perform an inverse transform of the encoded video data at a second bit-depth using the dequantization shift and the mid-transform shift, wherein the second bit-depth is lower than the first bit-depth.

Figure 6:
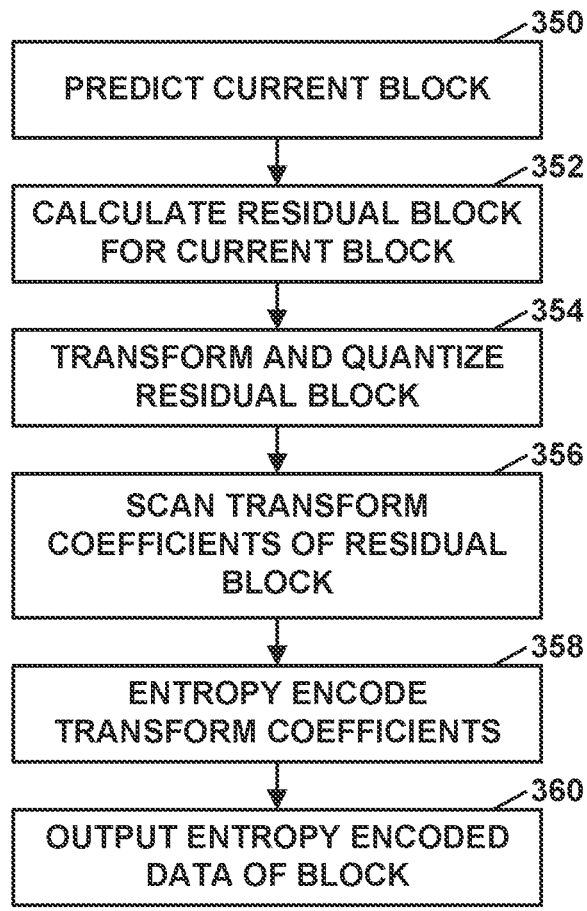
FIG. 6 is a flowchart illustrating an example process for encoding a current block in accordance with the techniques of this disclosure.

FIG. 6 is a flowchart illustrating an example process for encoding a current block in accordance with the techniques of this disclosure. The current block may comprise a current CU. Although described with respect to video encoder 200 (FIGS. 1 and 4), it should be understood that other devices may be configured to perform a process similar to that of FIG. 6.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 7:
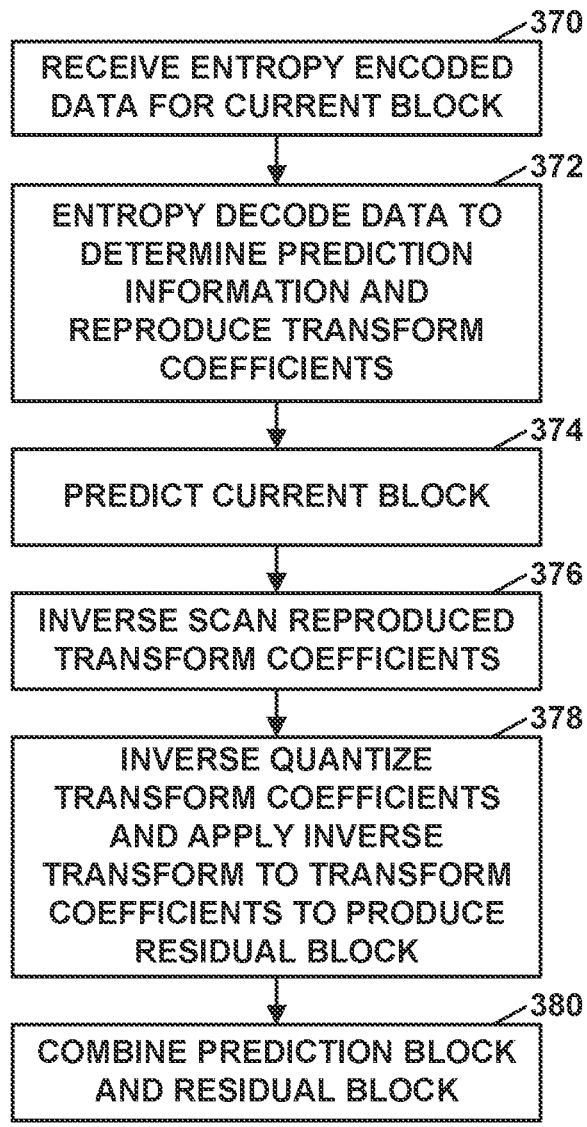
FIG. 7 is a flowchart illustrating an example process for decoding a current block in accordance with the techniques of this disclosure.

FIG. 7 is a flowchart illustrating an example process for decoding a current block of video data in accordance with the techniques of this disclosure. The current block may comprise a current CU. Although described with respect to video decoder 300 (FIGS. 1 and 5), it should be understood that other devices may be configured to perform a process similar to that of FIG. 7.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372).

Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 8:
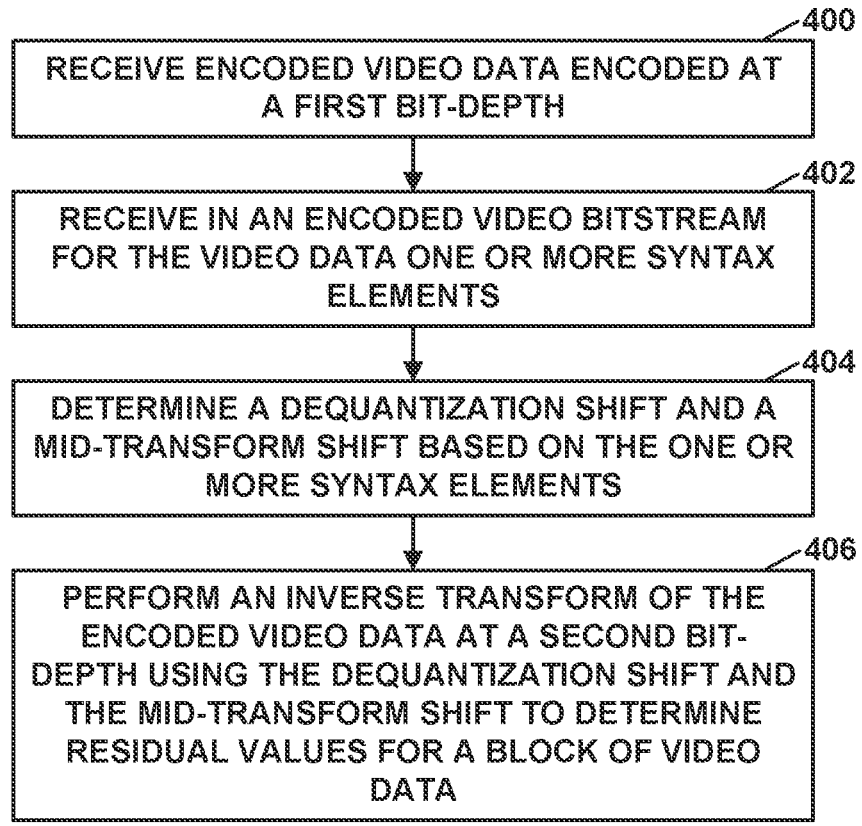
FIG. 8 is a flowchart illustrating an example process for decoding a current block in accordance with the techniques of this disclosure.

FIG. 8 is a flowchart illustrating an example process for decoding a current block of video data in accordance with the techniques of this disclosure. Although described with respect to video decoder 300 (FIGS. 1 and 5), it should be understood that other devices may be configured to perform a process similar to that of FIG. 8.

Video decoder 300 receives encoded video data encoded at a first bit-depth (400). Video decoder 300 receives in an encoded video bitstream for the video data one or more syntax elements (402). The one or more syntax elements may, for example, include a first delta value.

Video decoder 300 determines a dequantization shift and a mid-transform shift based on the one or more syntax elements (404). To determine the dequantization shift and the mid-transform shift based on the one or more syntax elements, video decoder 300 may determine a value for the dequantization shift based on a determination of whether the second bit-depth is less than the first bit-depth. To determine the dequantization shift and the mid-transform shift based on the one or more syntax elements, video decoder 300 may determine a value for the mid-transform shift based on a determination of whether the second bit-depth is less than the first bit-depth. To determine the dequantization shift and the mid-transform shift based on the one or more syntax elements, video decoder 300 may determine a first shift value and determine the dequantization shift based on the first shift value and the first delta value. The first shift value may, for example, be a fixed value defined by a video codec. To determine the dequantization shift and the mid-transform shift based on the one or more syntax elements, video decoder 300 may determine a second shift value and determine the mid-transform shift based on the second shift value and the first delta value.

Video decoder 300 performs an inverse transform of the encoded video data at a second bit-depth using the dequantization shift and the mid-transform shift to determine residual values for a block of video data (406). The second bit-depth is different than the first bit-depth. To perform the inverse transform of the encoded video data at the second bit-depth using the dequantization shift and the mid-transform shift to determine residual values for the block of video data, video decoder 300 may, in response to determining that a value of the dequantization shift is negative, apply a left shift to scaled transform coefficients. To perform the inverse transform of the encoded video data at the second bit-depth using the dequantization shift and the mid-transform shift, video decoder 300 may apply the dequantization shift to scaled transform coefficients. To perform the inverse transform of the encoded video data at the second bit-depth, video decoder 300 may store intermediate values at the second bit-depth.

In some examples, video decoder 300 may be configured to determine quantized transform coefficients; inverse quantize the quantized transform coefficient to determine dequantized transform coefficients; apply the dequantization shift to the dequantized transform coefficients to determine shifted dequantized transform coefficients; apply a first separable transform to the shifted dequantized transform coefficients to determine first transform coefficients; apply the mid-transform shift to the first transform coefficients to determine first shifted transform coefficients; and apply a second separable transform to the first shifted transform coefficients to determine the residual values. Video decoder 300 may additionally determine a normalization shift based on the dequantization shift and the mid-transform shift and apply the normalization shift to the residual values.

In some examples, video decoder 300 may be configured to determine quantized transform coefficients; inverse quantize the quantized transform coefficient to determine dequantized transform coefficients; apply the dequantization shift to the dequantized transform coefficients to determine shifted dequantized transform coefficients; apply a low frequency non-separable transform (LFNST) to the shifted dequantized transform coefficients to determine LFNST coefficients; apply a first separable transform to the LFNST coefficients to determine first transform coefficients; apply the mid-transform shift to the first transform coefficients to create first shifted transform coefficients; and apply a second separable transform to the first shifted transform coefficients to determine the residual values. To apply the first separable transform to the LFNST coefficients to determine first transform coefficients, video decoder 300 may clip intermediate values for the LFNST coefficients to the second bit-depth to determine final values for the LFNST coefficients.

The following numbered clauses illustrate one or more aspects of the devices and techniques described in this disclosure.

Clause 1A. A method of decoding video data, the method comprising: receiving encoded video data encoded at a first bit-depth; determining one or more of a dequantization shift (shift1) or a mid-transform shift (shift2) based on information in an encoded video bitstream; and performing an inverse transform of the encoded video data at a second bit-depth using the dequantization shift and the mid-transform shift, wherein the second bit-depth is lower than the first bit-depth.

Clause 2A. The method of Clause 1A, wherein determining one or more of the dequantization shift (shift1) or the mid-transform shift (shift2) based on information in the encoded video bitstream comprises: determining the dequantization shift (shift1) and the mid-transform shift (shift2) based on syntax elements received in the encoded video bitstream.

Clause 3A. The method of Clause 1A, wherein determining one or more of the dequantization shift (shift1) or the mid-transform shift (shift2) based on information in the encoded video bitstream comprises: determining the dequantization shift (shift1) based on a syntax element received in the encoded video bitstream; and determining the mid-transform shift (shift2) based on a transform unit height and/or width.

Clause 4A. The method of Clause 1A, wherein determining one or more of the dequantization shift (shift1) or the mid-transform shift (shift2) based on information in the encoded video bitstream comprises: analyzing transform coefficients in a block of video data to identify a transform coefficient with a highest number of bits used to represent the transform coefficient; determining the dequantization shift (shift1) based on the highest number of bits used to represent the transform coefficient; and determining the mid-transform shift (shift2) based on a transform unit height and/or width.

Clause 5A. The method of any of Clauses 1A-4A, further comprising: determining quantized transform coefficients; inverse quantizing the quantized transform coefficient to produce dequantized transform coefficients; applying the dequantization shift to the dequantized transform coefficients to create shifted dequantized transform coefficients; applying a first separable transform to the shifted dequantized transform coefficients to create first transform coefficients; applying the mid-transform shift (shift2) to the first transform coefficients to create first shifted transform coefficients; and applying a second separable transform to the first shifted transform coefficients to create residual values.

Clause 6A. The method of Clause 5A, further comprising: determining a normalization shift (shift3) based on the dequantization shift (shift1) and the mid-transform shift (shift2); and applying the normalization shift (shift3) to the residual values.

Clause 7A. The method of any of Clauses 1A-6A, further comprising: performing a clipping operation prior to one or more stages of the inverse transform based on the second bit-depth.

Clause 8A. A method of encoding video data, the method comprising: determining one or more of a dequantization shift (shift1) or a mid-transform shift (shift2); and signaling one or more syntax elements indicating the value of one or more of the dequantization shift (shift1) or the mid-transform shift (shift2).

Clause 9A. A device for coding video data, the device comprising one or more means for performing the method of any of Clauses 1A-8A.

Clause 10A. The device of Clause 9A, wherein the one or more means comprise one or more processors implemented in circuitry.

Clause 11A. The device of any of Clauses 9A and 10A, further comprising a memory to store the video data.

Clause 12A. The device of any of Clauses 9A-11A, further comprising a display configured to display decoded video data.

Clause 13A. The device of any of Clauses 9A-12A, wherein the device comprises one or more of a camera, a computer, a mobile device, a broadcast receiver device, or a set-top box.

Clause 14A. The device of any of Clauses 9A-12A, wherein the device comprises a video decoder.

Clause 15A. The device of any of Clauses 9A-13A, wherein the device comprises a video encoder.

Clause 16A. A computer-readable storage medium having stored thereon instructions that, when executed, cause one or more processors to perform the method of any of Clauses 1A-8A.

Clause 17A. A method of decoding video data, the method comprising: receiving encoded video data encoded at a first bit-depth; determining one or more of a dequantization shift (shift1) or a mid-transform shift (shift2) based on information in an encoded video bitstream; and performing an inverse transform of the encoded video data at a second bit-depth using the dequantization shift and the mid-transform shift, wherein the second bit-depth is lower than the first bit-depth.

Clause 18A. The method of Clause 17A, wherein determining one or more of the dequantization shift (shift1) or the mid-transform shift (shift2) based on information in the encoded video bitstream comprises: determining the dequantization shift (shift1) and the mid-transform shift (shift2) based on syntax elements received in the encoded video bitstream.

Clause 19A. The method of Clause 17A, wherein determining one or more of the dequantization shift (shift1) or the mid-transform shift (shift2) based on information in the encoded video bitstream comprises: determining the dequantization shift (shift1) based on a syntax element received in the encoded video bitstream; and determining the mid-transform shift (shift2) based on at least one of a transform unit height or width.

Clause 20A. The method of Clause 17A, wherein determining one or more of the dequantization shift (shift1) or the mid-transform shift (shift2) based on information in the encoded video bitstream comprises: analyzing transform coefficients in a block of video data to identify a transform coefficient with a highest number of bits used to represent the transform coefficient; determining the dequantization shift (shift1) based on the highest number of bits used to represent the transform coefficient; and determining the mid-transform shift (shift2) based on at least one of a transform unit height or width.

Clause 21A. The method of Clause 17A, further comprising: determining quantized transform coefficients; inverse quantizing the quantized transform coefficient to produce dequantized transform coefficients; applying the dequantization shift to the dequantized transform coefficients to create shifted dequantized transform coefficients; applying a first separable transform to the shifted dequantized transform coefficients to create first transform coefficients; applying the mid-transform shift (shift2) to the first transform coefficients to create first shifted transform coefficients; and applying a second separable transform to the first shifted transform coefficients to create residual values.

Clause 22A. The method of Clause 21A, further comprising: determining a normalization shift (shift3) based on the dequantization shift (shift1) and the mid-transform shift (shift2); and applying the normalization shift (shift3) to the residual values.

Clause 23A. The method of Clause 17A, further comprising: performing a clipping operation prior to one or more stages of the inverse transform based on the second bit-depth.

Clause 24A. A device for coding video data, the device comprising a memory and one or more processors configured to perform the method of any of Clauses 17-23.

Clause 1B. A method of decoding video data, the method comprising: receiving encoded video data encoded at a first bit-depth; receiving in an encoded video bitstream for the video data one or more syntax elements; determining a dequantization shift and a mid-transform shift based on the one or more syntax elements; and performing an inverse transform of the encoded video data at a second bit-depth using the dequantization shift and the mid-transform shift to determine residual values for a block of video data, wherein the second bit-depth is different than the first bit-depth.

Clause 2B. The method of clause 1B, wherein determining the dequantization shift and the mid-transform shift further comprises determining a value for the dequantization shift based on a determination of whether the second bit-depth is less than the first bit-depth.

Clause 3B. The method of clause 1B, wherein determining the dequantization shift and the mid-transform shift further comprises determining a value for the mid-transform shift based on a determination of whether the second bit-depth is less than the first bit-depth.

Clause 4B. The method of clause 1B, wherein performing the inverse transform of the encoded video data at the second bit-depth using the dequantization shift and the mid-transform shift to determine residual values for the block of video data comprises, in response to determining that a value of the dequantization shift is negative, applying a left shift to scaled transform coefficients.

Clause 5B. The method of clause 1B, wherein performing the inverse transform of the encoded video data at the second bit-depth using the dequantization shift and the mid-transform shift comprises applying the dequantization shift to scaled transform coefficients.

Clause 6B. The method of clause 1B, wherein performing the inverse transform of the encoded video data at the second bit-depth comprises storing intermediate values at the second bit-depth.

Clause 7B. The method of clause 1B, wherein: receiving in the encoded video bitstream for the video data one or more syntax elements comprises receiving a first delta value; and determining the dequantization shift and the mid-transform shift based on the one or more syntax elements comprises: determining a first shift value; and determining the dequantization shift based on the first shift value and the first delta value.

Clause 8B. The method of clause 1B, wherein: receiving in the encoded video bitstream for the video data one or more syntax elements comprises receiving a first delta value; and determining the dequantization shift and the mid-transform shift based on the one or more syntax elements comprises: determining a first shift value; and determining the mid-transform shift based on the first shift value and the first delta value.

Clause 9B. The method of clause 1B, wherein first bit-depth is 12 bits and the second bit-depth is 16 bits.

Clause 10B. The method of clause 1B, further comprising: determining quantized transform coefficients; inverse quantizing the quantized transform coefficient to determine dequantized transform coefficients; applying the dequantization shift to the dequantized transform coefficients to determine shifted dequantized transform coefficients; applying a first separable transform to the shifted dequantized transform coefficients to determine first transform coefficients; applying the mid-transform shift to the first transform coefficients to determine first shifted transform coefficients; and applying a second separable transform to the first shifted transform coefficients to determine the residual values.

Clause 11B. The method of clause 1B, further comprising: determining quantized transform coefficients; inverse quantizing the quantized transform coefficient to determine dequantized transform coefficients; applying the dequantization shift to the dequantized transform coefficients to determine shifted dequantized transform coefficients; applying a low frequency non-separable transform (LFNST) to the shifted dequantized transform coefficients to determine LFNST coefficients; applying a first separable transform to the LFNST coefficients to determine first transform coefficients; applying the mid-transform shift to the first transform coefficients to create first shifted transform coefficients; and applying a second separable transform to the first shifted transform coefficients to determine the residual values.

Clause 12B. The method of clause 11B, further comprising: determining a normalization shift based on the dequantization shift and the mid-transform shift; and applying the normalization shift to the residual values.

Clause 13B. The method of clause 11B, wherein applying the first separable transform to the LFNST coefficients to determine first transform coefficients further comprises clipping intermediate values for the LFNST coefficients to the second bit-depth to determine final values for the LFNST coefficients.

Clause 14B. A device for decoding video data, the device comprising: a memory configured to store video data; one or more processors implemented in circuitry and configured to: receive encoded video data encoded at a first bit-depth; receive in an encoded video bitstream for the video data one or more syntax elements; determine a dequantization shift and a mid-transform shift based on the one or more syntax elements; and perform an inverse transform of the encoded video data at a second bit-depth using the dequantization shift and the mid-transform shift to determine residual values for a block of video data, wherein the second bit-depth is different than the first bit-depth.

Clause 15B. The device of clause 14B, wherein to determine the dequantization shift and the mid-transform shift, the one or more processors are further configured to determine a value for the dequantization shift based on a determination of whether the second bit-depth is less than the first bit-depth.

Clause 16B. The device of clause 14B, wherein to determine the dequantization shift and the mid-transform shift, the one or more processors are further configured to determine a value for the mid-transform shift based on a determination of whether the second bit-depth is less than the first bit-depth.

Clause 17B. The device of clause 14B, wherein to perform the inverse transform of the encoded video data at the second bit-depth using the dequantization shift and the mid-transform shift to determine residual values for the block of video data, the one or more processors are further configured to, in response to determining that a value of the dequantization shift is negative, apply a left shift to scaled transform coefficients.

Clause 18B. The device of clause 14B, wherein to perform the inverse transform of the encoded video data at the second bit-depth using the dequantization shift and the mid-transform shift, the one or more processors are further configured to apply the dequantization shift to scaled transform coefficients.

Clause 19B. The device of clause 14B, wherein to perform the inverse transform of the encoded video data at the second bit-depth, the one or more processors are further configured to store intermediate values at the second bit-depth.

Clause 20B. The device of clause 14B, wherein: to receive in the encoded video bitstream for the video data one or more syntax elements, the one or more processors are further configured to receive a first delta value; and to determine the dequantization shift and the mid-transform shift based on the one or more syntax elements, the one or more processors are further configured to: determine a first shift value; and determine the dequantization shift based on the first shift value and the first delta value.

Clause 21B. The device of clause 14B, wherein: to receive in the encoded video bitstream for the video data one or more syntax elements, the one or more processors are further configured to receiving a first delta value; and to determine the dequantization shift and the mid-transform shift based on the one or more syntax elements, the one or more processors are further configured to: determine a first shift value; and determine the mid-transform shift based on the first shift value and the first delta value.

Clause 22B. The device of clause 14B, wherein first bit-depth is 12 bits and the second bit-depth is 16 bits.

Clause 23B. The device of clause 14B, wherein the one or more processors are further configured to: determine quantized transform coefficients; inverse quantize the quantized transform coefficient to determine dequantized transform coefficients; apply the dequantization shift to the dequantized transform coefficients to determine shifted dequantized transform coefficients; apply a first separable transform to the shifted dequantized transform coefficients to determine first transform coefficients; apply the mid-transform shift to the first transform coefficients to determine first shifted transform coefficients; and apply a second separable transform to the first shifted transform coefficients to determine the residual values.

Clause 24B. The device of clause 14B, wherein the one or more processors are further configured to: determine quantized transform coefficients; inverse quantize the quantized transform coefficient to determine dequantized transform coefficients; apply the dequantization shift to the dequantized transform coefficients to determine shifted dequantized transform coefficients; apply a low frequency non-separable transform (LFNST) to the shifted dequantized transform coefficients to determine LFNST coefficients; apply a first separable transform to the LFNST coefficients to determine first transform coefficients; apply the mid-transform shift to the first transform coefficients to create first shifted transform coefficients; and apply a second separable transform to the first shifted transform coefficients to determine the residual values.

Clause 25B. The device of clause 24B, wherein the one or more processors are further configured to: determine a normalization shift based on the dequantization shift and the mid-transform shift; and apply the normalization shift to the residual values.

Clause 26B. The device of clause 24B, wherein to apply the first separable transform to the LFNST coefficients to determine first transform coefficients, the one or more processors are further configured to clip intermediate values for the LFNST coefficients to the second bit-depth to determine final values for the LFNST coefficients.

Clause 27B. The device of clause 14B, wherein the device comprises a wireless communication device, further comprising a receiver configured to receive encoded video data.

Clause 28B. The device of clause 27B, wherein the wireless communication device comprises a telephone handset and wherein the receiver is configured to demodulate, according to a wireless communication standard, a signal comprising the encoded video data.

Clause 29B. The device of clause 14B, further comprising: a display configured to display decoded video data.

Clause 30B. The device of clause 14B, wherein the device comprises one or more of a camera, a computer, a mobile device, a broadcast receiver device, or a set-top box.

Clause 1C. A method of decoding video data, the method comprising: receiving encoded video data encoded at a first bit-depth; receiving in an encoded video bitstream for the video data one or more syntax elements; determining a dequantization shift and a mid-transform shift based on the one or more syntax elements; and performing an inverse transform of the encoded video data at a second bit-depth using the dequantization shift and the mid-transform shift to determine residual values for a block of video data, wherein the second bit-depth is different than the first bit-depth.

Clause 2C. The method of clause 1C, wherein determining the dequantization shift and the mid-transform shift further comprises determining a value for the dequantization shift based on a determination of whether the second bit-depth is less than the first bit-depth.

Clause 3C. The method of clause 1C or 2C, wherein determining the dequantization shift and the mid-transform shift further comprises determining a value for the mid-transform shift based on a determination of whether the second bit-depth is less than the first bit-depth.

Clause 4C. The method of any of clauses 1C-3C, wherein performing the inverse transform of the encoded video data at the second bit-depth using the dequantization shift and the mid-transform shift to determine residual values for the block of video data comprises, in response to determining that a value of the dequantization shift is negative, applying a left shift to scaled transform coefficients.

Clause 5C. The method of any of clauses 1C-4C, wherein performing the inverse transform of the encoded video data at the second bit-depth using the dequantization shift and the mid-transform shift comprises applying the dequantization shift to scaled transform coefficients.

Clause 6C. The method of any of clauses 1C-5C, wherein performing the inverse transform of the encoded video data at the second bit-depth comprises storing intermediate values at the second bit-depth.

Clause 7C. The method of any of clauses 1C-6C, wherein: receiving in the encoded video bitstream for the video data one or more syntax elements comprises receiving a first delta value; and determining the dequantization shift and the mid-transform shift based on the one or more syntax elements comprises: determining a first shift value; and determining the dequantization shift based on the first shift value and the first delta value.

Clause 8C. The method of any of clauses 1C-7C, wherein: receiving in the encoded video bitstream for the video data one or more syntax elements comprises receiving a first delta value; and determining the dequantization shift and the mid-transform shift based on the one or more syntax elements comprises: determining a first shift value; and determining the mid-transform shift based on the first shift value and the first delta value.

Clause 9C. The method of any of clauses 1C-8C, wherein first bit-depth is 12 bits and the second bit-depth is 16 bits.

Clause 10C. The method of any of clauses 1C-9C, further comprising: determining quantized transform coefficients; inverse quantizing the quantized transform coefficient to determine dequantized transform coefficients; applying the dequantization shift to the dequantized transform coefficients to determine shifted dequantized transform coefficients; applying a first separable transform to the shifted dequantized transform coefficients to determine first transform coefficients; applying the mid-transform shift to the first transform coefficients to determine first shifted transform coefficients; and applying a second separable transform to the first shifted transform coefficients to determine the residual values.

Clause 11C. The method of any of clauses 1C-10C, further comprising: determining quantized transform coefficients; inverse quantizing the quantized transform coefficient to determine dequantized transform coefficients; applying the dequantization shift to the dequantized transform coefficients to determine shifted dequantized transform coefficients; applying a low frequency non-separable transform (LFNST) to the shifted dequantized transform coefficients to determine LFNST coefficients; applying a first separable transform to the LFNST coefficients to determine first transform coefficients; applying the mid-transform shift to the first transform coefficients to create first shifted transform coefficients; and applying a second separable transform to the first shifted transform coefficients to determine the residual values.

Clause 12C. The method of clause 11C, further comprising: determining a normalization shift based on the dequantization shift and the mid-transform shift; and applying the normalization shift to the residual values.

Clause 13C. The method of clause 11C or 12C, wherein applying the first separable transform to the LFNST coefficients to determine first transform coefficients further comprises clipping intermediate values for the LFNST coefficients to the second bit-depth to determine final values for the LFNST coefficients.

Clause 14C. A device for decoding video data, the device comprising: a memory configured to store video data; and one or more processors implemented in circuitry and configured to: receive encoded video data encoded at a first bit-depth; receive in an encoded video bitstream for the video data one or more syntax elements; determine a dequantization shift and a mid-transform shift based on the one or more syntax elements; and perform an inverse transform of the encoded video data at a second bit-depth using the dequantization shift and the mid-transform shift to determine residual values for a block of video data, wherein the second bit-depth is different than the first bit-depth.

Clause 15C. The device of clause 14C, wherein to determine the dequantization shift and the mid-transform shift, the one or more processors are further configured to determine a value for the dequantization shift based on a determination of whether the second bit-depth is less than the first bit-depth.

Clause 16C. The device of clause 14C or 15C, wherein to determine the dequantization shift and the mid-transform shift, the one or more processors are further configured to determine a value for the mid-transform shift based on a determination of whether the second bit-depth is less than the first bit-depth.

Clause 17C. The device of any of clauses 14C-16C, wherein to perform the inverse transform of the encoded video data at the second bit-depth using the dequantization shift and the mid-transform shift to determine residual values for the block of video data, the one or more processors are further configured to, in response to determining that a value of the dequantization shift is negative, apply a left shift to scaled transform coefficients.

Clause 18C. The device of any of clauses 14C-17C, wherein to perform the inverse transform of the encoded video data at the second bit-depth using the dequantization shift and the mid-transform shift, the one or more processors are further configured to apply the dequantization shift to scaled transform coefficients.

Clause 19C. The device of any of clauses 14C-18C, wherein to perform the inverse transform of the encoded video data at the second bit-depth, the one or more processors are further configured to store intermediate values at the second bit-depth.

Clause 20C. The device of any of clauses 14C-19C, wherein: to receive in the encoded video bitstream for the video data one or more syntax elements, the one or more processors are further configured to receive a first delta value; and to determine the dequantization shift and the mid-transform shift based on the one or more syntax elements, the one or more processors are further configured to: determine a first shift value; and determine the dequantization shift based on the first shift value and the first delta value.

Clause 21C. The device of any of clauses 14C-20C, wherein: to receive in the encoded video bitstream for the video data one or more syntax elements, the one or more processors are further configured to receiving a first delta value; and to determine the dequantization shift and the mid-transform shift based on the one or more syntax elements, the one or more processors are further configured to: determine a first shift value; and determine the mid-transform shift based on the first shift value and the first delta value.

Clause 22C. The device of any of clauses 14C-21C, wherein first bit-depth is 12 bits and the second bit-depth is 16 bits.

Clause 23C. The device of any of clauses 14C-22C, wherein the one or more processors are further configured to: determine quantized transform coefficients; inverse quantize the quantized transform coefficient to determine dequantized transform coefficients; apply the dequantization shift to the dequantized transform coefficients to determine shifted dequantized transform coefficients; apply a first separable transform to the shifted dequantized transform coefficients to determine first transform coefficients; apply the mid-transform shift to the first transform coefficients to determine first shifted transform coefficients; and apply a second separable transform to the first shifted transform coefficients to determine the residual values.

Clause 24C. The device of any of clauses 14C-23C, wherein the one or more processors are further configured to: determine quantized transform coefficients; inverse quantize the quantized transform coefficient to determine dequantized transform coefficients; apply the dequantization shift to the dequantized transform coefficients to determine shifted dequantized transform coefficients; apply a low frequency non-separable transform (LFNST) to the shifted dequantized transform coefficients to determine LFNST coefficients; apply a first separable transform to the LFNST coefficients to determine first transform coefficients; apply the mid-transform shift to the first transform coefficients to create first shifted transform coefficients; and apply a second separable transform to the first shifted transform coefficients to determine the residual values.

Clause 25C. The device of clause 24C, wherein the one or more processors are further configured to: determine a normalization shift based on the dequantization shift and the mid-transform shift; and apply the normalization shift to the residual values.

Clause 26C. The device of clause 24C or 25C, wherein to apply the first separable transform to the LFNST coefficients to determine first transform coefficients, the one or more processors are further configured to clip intermediate values for the LFNST coefficients to the second bit-depth to determine final values for the LFNST coefficients.

Clause 27C. The device of any of clauses 14C-26C, wherein the device comprises a wireless communication device, further comprising a receiver configured to receive encoded video data.

Clause 28C. The device of clause 27C, wherein the wireless communication device comprises a telephone handset and wherein the receiver is configured to demodulate, according to a wireless communication standard, a signal comprising the encoded video data.

Clause 29C. The device of any of clauses 14C-28C, further comprising: a display configured to display decoded video data.

Clause 30C. The device of any of clauses 14C-29C, wherein the device comprises one or more of a camera, a computer, a mobile device, a broadcast receiver device, or a set-top box.

Clause 31C. An apparatus comprising: means for receiving encoded video data encoded at a first bit-depth; means for receiving in an encoded video bitstream for the video data one or more syntax elements; means for determining a dequantization shift and a mid-transform shift based on the one or more syntax elements; and means for performing an inverse transform of the encoded video data at a second bit-depth using the dequantization shift and the mid-transform shift to determine residual values for a block of video data, wherein the second bit-depth is different than the first bit-depth.

Clause 32C. A computer-readable storage medium storing instructions that when executed by one or more processors cause the one or more processors to: receive encoded video data encoded at a first bit-depth; receive in an encoded video bitstream for the video data one or more syntax elements; determine a dequantization shift and a mid-transform shift based on the one or more syntax elements; and perform an inverse transform of the encoded video data at a second bit-depth using the dequantization shift and the mid-transform shift to determine residual values for a block of video data, wherein the second bit-depth is different than the first bit-depth.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
receiving encoded video data encoded at a first bit-depth;
receiving, in an encoded video bitstream for the video data, one or more syntax elements, wherein the one or more syntax elements include a syntax element indicating a delta value;
determining a dequantization shift and a mid-transform shift based on the one or more syntax elements, wherein determining the dequantization shift and the mid-transform shift based on the one or more syntax elements comprises:
determining a shift value; and
determining the dequantization shift based on the shift value and the delta value; and
performing an inverse transform of the encoded video data at a second bit-depth using the dequantization shift and the mid-transform shift to determine residual values for a block of video data, wherein the second bit-depth is different than the first bit-depth, wherein determining the dequantization shift and the mid-transform shift further comprises determining a value for the dequantization shift based on whether the second bit-depth is different from the first bit-depth.

2. The method of claim 1, wherein determining the dequantization shift and the mid-transform shift further comprises determining a value for the dequantization shift based on a determination of whether the second bit-depth is less than the first bit-depth.

3. The method of claim 1, wherein determining the dequantization shift and the mid-transform shift further comprises determining a value for the mid-transform shift based on a determination of whether the second bit-depth is less than the first bit-depth.

4. The method of claim 1, wherein performing the inverse transform of the encoded video data at the second bit-depth using the dequantization shift and the mid-transform shift to determine residual values for the block of video data comprises, in response to determining that a value of the dequantization shift is negative, applying a left shift to scaled transform coefficients.

5. The method of claim 1, wherein performing the inverse transform of the encoded video data at the second bit-depth using the dequantization shift and the mid-transform shift comprises applying the dequantization shift to scaled transform coefficients.

6. The method of claim 1, wherein performing the inverse transform of the encoded video data at the second bit-depth comprises storing intermediate values at the second bit-depth.

7. The method of claim 1, wherein:
the syntax element is a first syntax element, the shift value is a first shift value, and the delta value is a first delta value;
receiving the one or more syntax elements comprises receiving a second syntax element indicating a second delta value; and determining the dequantization shift and the mid-transform shift based on the one or more syntax elements comprises:
  determining a second shift value; and
  determining the mid-transform shift based on the second shift value and the second delta value.

8. The method of claim 1, wherein first bit-depth is 12 bits and the second bit-depth is 16 bits.

9. The method of claim 1, further comprising:
  determining quantized transform coefficients;
  inverse quantizing the quantized transform coefficient to determine dequantized transform coefficients;
  applying the dequantization shift to the dequantized transform coefficients to determine shifted dequantized transform coefficients;
  applying a first separable transform to the shifted dequantized transform coefficients to determine first transform coefficients;
  applying the mid-transform shift to the first transform coefficients to determine first shifted transform coefficients; and
  applying a second separable transform to the first shifted transform coefficients to determine the residual values.

10. The method of claim 1, further comprising:
  determining quantized transform coefficients;
  inverse quantizing the quantized transform coefficient to determine dequantized transform coefficients;
  applying the dequantization shift to the dequantized transform coefficients to determine shifted dequantized transform coefficients;
  applying a low frequency non-separable transform (LFNST) to the shifted dequantized transform coefficients to determine LFNST coefficients;
  applying a first separable transform to the LFNST coefficients to determine first transform coefficients;
  applying the mid-transform shift to the first transform coefficients to create first shifted transform coefficients; and
  applying a second separable transform to the first shifted transform coefficients to determine the residual values.

11. The method of claim 10, further comprising:
  determining a normalization shift based on the dequantization shift and the mid-transform shift; and
  applying the normalization shift to the residual values.

12. The method of claim 10, wherein applying the first separable transform to the LFNST coefficients to determine first transform coefficients further comprises clipping intermediate values for the LFNST coefficients to the second bit-depth to determine final values for the LFNST coefficients.

13. A device for decoding video data, the device comprising:
  a memory configured to store video data;
  one or more processors implemented in circuitry and configured to:
    receive encoded video data encoded at a first bit-depth;
    receive, in an encoded video bitstream for the video data, one or more syntax elements, wherein the one or more syntax elements include a syntax element indicating a delta value;
    determine a dequantization shift and a mid-transform shift based on the one or more syntax elements, wherein to determine the dequantization shift and the mid-transform shift based on the one or more syntax elements, the one or more processors are configured to:
      determine a shift value; and
      determine the dequantization shift based on the shift value and the delta value; and
    perform an inverse transform of the encoded video data at a second bit-depth using the dequantization shift and the mid-transform shift to determine residual values for a block of video data, wherein the second bit-depth is different than the first bit-depth, wherein to determine the dequantization shift and the mid-transform shift, the one or more processors are further configured to determine a value for the dequantization shift based on whether the second bit-depth is different than the first bit-depth.

14. The device of claim 13, wherein to determine the dequantization shift and the mid-transform shift, the one or more processors are further configured to determine a value for the dequantization shift based on a determination of whether the second bit-depth is less than the first bit-depth.

15. The device of claim 13, wherein to determine the dequantization shift and the mid-transform shift, the one or more processors are further configured to determine a value for the mid-transform shift based on a determination of whether the second bit-depth is less than the first bit-depth.

16. The device of claim 13, wherein to perform the inverse transform of the encoded video data at the second bit-depth using the dequantization shift and the mid-transform shift to determine residual values for the block of video data, the one or more processors are further configured to, in response to determining that a value of the dequantization shift is negative, apply a left shift to scaled transform coefficients.

17. The device of claim 13, wherein to perform the inverse transform of the encoded video data at the second bit-depth using the dequantization shift and the mid-transform shift, the one or more processors are further configured to apply the dequantization shift to scaled transform coefficients.

18. The device of claim 13, wherein to perform the inverse transform of the encoded video data at the second bit-depth, the one or more processors are further configured to store intermediate values at the second bit-depth.

19. The device of claim 13, wherein:
  the syntax element is a first syntax element, the shift value is a first shift value, and the delta value is a first delta value;
  to receive the one or more syntax elements, the one or more processors are further configured to receiving a second syntax element indicating a second delta value; and
  to determine the dequantization shift and the mid-transform shift based on the one or more syntax elements, the one or more processors are further configured to:
    determine a second shift value; and
    determine the mid-transform shift based on the second shift value and the second delta value.

20. The device of claim 13, wherein first bit-depth is 12 bits and the second bit-depth is 16 bits.

21. The device of claim 13, wherein the one or more processors are further configured to:
  determine quantized transform coefficients;
  inverse quantize the quantized transform coefficient to determine dequantized transform coefficients;
  apply the dequantization shift to the dequantized transform coefficients to determine shifted dequantized transform coefficients;
  apply a first separable transform to the shifted dequantized transform coefficients to determine first transform coefficients;

apply the mid-transform shift to the first transform coefficients to determine first shifted transform coefficients; and apply a second separable transform to the first shifted transform coefficients to determine the residual values.

22. The device of claim 13, wherein the one or more processors are further configured to:

determine quantized transform coefficients;

inverse quantize the quantized transform coefficient to determine dequantized transform coefficients;

apply the dequantization shift to the dequantized transform coefficients to determine shifted dequantized transform coefficients;

apply a low frequency non-separable transform (LFNST) to the shifted dequantized transform coefficients to determine LFNST coefficients;

apply a first separable transform to the LFNST coefficients to determine first transform coefficients;

apply the mid-transform shift to the first transform coefficients to create first shifted transform coefficients; and apply a second separable transform to the first shifted transform coefficients to determine the residual values.

23. The device of claim 22, wherein the one or more processors are further configured to:

determine a normalization shift based on the dequantization shift and the mid-transform shift; and apply the normalization shift to the residual values.

24. The device of claim 22, wherein to apply the first separable transform to the LFNST coefficients to determine first transform coefficients, the one or more processors are further configured to clip intermediate values for the LFNST coefficients to the second bit-depth to determine final values for the LFNST coefficients.

25. The device of claim 13, wherein the device comprises a wireless communication device, further comprising a receiver configured to receive encoded video data.

26. The device of claim 25, wherein the wireless communication device comprises a telephone handset and wherein the receiver is configured to demodulate, according to a wireless communication standard, a signal comprising the encoded video data.

27. The device of claim 13, further comprising:

a display configured to display decoded video data.

28. The device of claim 13, wherein the device comprises one or more of a camera, a computer, a mobile device, a broadcast receiver device, or a set-top box.

* * * * *